United States Patent
Sasaoka et al.

(10) Patent No.: US 9,442,724 B2
(45) Date of Patent: Sep. 13, 2016

(54) START CONTROL APPARATUS FOR CONTROLLING A START OF AN INFORMATION DEVICE BY USING AN INTERRUPT GENERATION CODE, INFORMATION DEVICE, AND START CONTROL METHOD

(71) Applicant: PANASONIC CORPORATION, Osaka (JP)

(72) Inventors: Toshio Sasaoka, Nara (JP); Naoya Ichinose, Tokyo (JP)

(73) Assignee: SOCIONEXT INC., Kanagawa (JP)

( * ) Notice: Subject to any disclaimer, the term of this patent is extended or adjusted under 35 U.S.C. 154(b) by 205 days.

(21) Appl. No.: 13/954,625

(22) Filed: Jul. 30, 2013

(65) Prior Publication Data
US 2013/0318331 A1 Nov. 28, 2013

Related U.S. Application Data

(63) Continuation of application No. PCT/JP2011/007056, filed on Dec. 16, 2011.

(30) Foreign Application Priority Data

Jan. 31, 2011 (JP) ................................. 2011-018653

(51) Int. Cl.
*G06F 9/30* (2006.01)
*G06F 9/48* (2006.01)
(Continued)

(52) U.S. Cl.
CPC ........... *G06F 9/3005* (2013.01); *G06F 9/4401* (2013.01); *G06F 9/4812* (2013.01); *G06F 13/24* (2013.01)

(58) Field of Classification Search
None
See application file for complete search history.

(56) References Cited

U.S. PATENT DOCUMENTS 5,552,981 A * 9/1996 Yamada ............................ 700/3
6,070,220 A * 5/2000 Katayama ..................... 710/264
(Continued)

FOREIGN PATENT DOCUMENTS

| JP | 2006-202252 A | 8/2006 |
|---|---|---|
| JP | 2008-065434 A | 3/2008 |

(Continued)

OTHER PUBLICATIONS

International Search Report issued in International Patent Application No. PCT/JP2011/007056 mailed on Feb. 28, 2012.

*Primary Examiner* — Reginald Bragdon
*Assistant Examiner* — Edward Wang
(74) *Attorney, Agent, or Firm* — McDermott Will & Emery LLP

(57) ABSTRACT

A CPU includes a code write unit which writes an interrupt generation code into a page in which the instructions stored in the non-volatile memory are not written, among a plurality of the pages included in an instruction area that is an area of the volatile memory into which the instructions are written, the interrupt generation code being a code for generating a software interrupt, an instruction transfer unit which transfers the instructions from the non-volatile memory to a corresponding page of the volatile memory that is a page in which the interrupt generation code generating the software interrupt is stored when the software interrupt is generated by the interrupt generation code, the instructions being to be stored in the corresponding page, and an instruction execution unit which executes the instructions stored in the instruction area, and when the interrupt generation code is executed, generates a software interrupt.

21 Claims, 52 Drawing Sheets

(51) Int. Cl.
*G06F 9/44* (2006.01)
*G06F 13/24* (2006.01)

(56) References Cited

U.S. PATENT DOCUMENTS

| | | |
|---|---|---|
| 7,395,397 B2 | 7/2008 | Ogawa |
| 7,890,671 B2 | 2/2011 | Iwahashi et al. |
| 2005/0005087 A1* | 1/2005 | Yang .............................. 712/227 |
| 2006/0173925 A1 | 8/2006 | Ogawa |
| 2008/0059662 A1 | 3/2008 | Iwahashi et al. |
| 2009/0006669 A1* | 1/2009 | Toyama et al. .................. 710/35 |
| 2010/0262818 A1* | 10/2010 | Lee ................................... 713/2 |
| 2010/0293342 A1* | 11/2010 | Morfey et al. ................. 711/154 |
| 2011/0022832 A1* | 1/2011 | Motohama et al. .............. 713/2 |
| 2012/0072658 A1 | 3/2012 | Hashimoto |

FOREIGN PATENT DOCUMENTS

| | | |
|---|---|---|
| JP | 2008-135051 A | 6/2008 |
| JP | 2010-231701 A | 10/2010 |
| JP | 2011-192139 A | 9/2011 |
| WO | WO-2010/140403 A1 | 12/2010 |

* cited by examiner

FIG. 4

| Page | | | | | | | | |
|---|---|---|---|---|---|---|---|---|
| A | pi | pi | pi | pi | pi | pi | pi | pi |
|   | pi | pi | pi | pi | pi | pi | pi | pi |
| B | pi | pi | pi | pi | pi | pi | pi | pi |
|   | pi | pi | pi | pi | pi | pi | pi | pi |
| C | pi | pi | pi | pi | pi | pi | pi | pi |
|   | pi | pi | pi | pi | pi | pi | pi | pi |
| D | pi | pi | pi | pi | pi | pi | pi | pi |
|   | pi | pi | pi | pi | pi | pi | pi | pi |
| E | pi | pi | pi | pi | pi | pi | pi | pi |
|   | pi | pi | pi | pi | pi | pi | pi | pi |
| F | pi | pi | pi | pi | pi | pi | pi | pi |
|   | pi | pi | pi | pi | pi | pi | pi | pi |

| Page | |
|---|---|
| A | mov 1, d0    add d1, d0<br>call memcpy    jmp 800 |
| B | pi pi pi pi pi pi pi pi<br>pi pi pi pi pi pi pi pi |
| C | pi pi pi pi pi pi pi pi<br>pi pi pi pi pi pi pi pi |
| D | pi pi pi pi pi pi pi pi<br>pi pi pi pi pi pi pi pi |
| E | pi pi pi pi pi pi pi pi<br>pi pi pi pi pi pi pi pi |
| F | pi pi pi pi pi pi pi pi<br>pi pi pi pi pi pi pi pi |

Page
         | mov 1, d0      add d1, d0
    A    | call memcpy    jmp 800
         | pi pi pi pi pi pi pi pi
    B    | pi pi pi pi pi pi pi pi
         | pi pi pi pi pi pi pi pi
    C    | pi pi pi pi pi pi pi pi
         | clr d2         cmp 0, d0    ↓
    D    | sub a0,a1      mov a1, sp   ↓
         | pi pi pi pi pi pi pi pi
    E    | pi pi pi pi pi pi pi pi
         | pi pi pi pi pi pi pi pi
    F    | pi pi pi pi pi pi pi pi

FIG. 11

| Page | Transfer management flag | 204 |
|------|--------------------------|-----|
| A | 1 |
| B | 1 |
| C | 0 |
| D | 0 |
| E | 1 |
| F | 1 |

FIG. 13

| Page | Transfer management flag | 204 |
|---|---|---|
| A | 0 | |
| B | 0 | |
| C | 0 | |
| D | 0 | |
| E | 0 | |
| F | 0 | |

FIG. 15

| Page | Transfer management flag 204 |
|---|---|
| A | 1 |
| B | 0 |
| C | 0 |
| D | 0 |
| E | 0 |
| F | 0 |

FIG. 16

| Page | Transfer management flag 204 |
|---|---|
| A | 1 |
| B | 0 |
| C | 0 |
| D | 1 |
| E | 0 |
| F | 0 |

FIG. 19

| Page | Transfer management flag | Boundary instruction presence or absence flag | Boundary instruction address | Head code |
|------|--------------------------|-----------------------------------------------|------------------------------|-----------|
| A | 0 | 0 | - | |
| B | 0 | 1 | 0x01fe | |
| C | 0 | 1 | 0x02fd | |
| D | 0 | 1 | 0x03fe | |
| E | 0 | 0 | - | |
| F | 0 | 0 | - | |

| Page | Boundary instruction presence or absence flag | Boundary instruction address |
|---|---|---|
| A | 0 | - |
| B | 1 | 0x01fe |
| C | 1 | 0x02fd |
| D | 1 | 0x03fe |
| E | 0 | - |
| F | 0 | - |

| Page | Transfer management flag | Boundary instruction presence or absence flag | Boundary instruction address | Head code |
|---|---|---|---|---|
| A | 0 | 0 | - | |
| B | 1 | 1 | 0x01fe | b0 |
| C | 0 | 1 | 0x02fd | |
| D | 0 | 1 | 0x03fe | |
| E | 0 | 0 | - | |
| F | 0 | 0 | - | |

| Page | Transfer management flag | Boundary instruction presence or absence flag | Boundary instruction address | Head code |
|---|---|---|---|---|
| A | 0 | 0 | - | |
| B | 1 | 1 | 0x01fe | b0 |
| C | 1 | 1 | 0x02fd | da |
| D | 0 | 1 | 0x03fe | |
| E | 0 | 0 | - | |
| F | 0 | 0 | - | |

| Page | Transfer management flag | Boundary instruction presence or absence flag | Boundary instruction address | Head code |
|---|---|---|---|---|
| A | 0 | 0 | - | |
| B | 1 | 1 | 0x01fe | b0 |
| C | 1 | 1 | 0x02fd | da |
| D | 1 | 1 | 0x03fe | b0 |
| E | 0 | 0 | - | |
| F | 0 | 0 | - | |

Page　　　　　　　　　　　　　202

| A | mov 1, d0　　add d1, d0<br>call memcpy　jmp 800 |
| B | pi pi pi pi pi pi pi pi<br>pi pi pi pi pi pi pi pi |
| C | pi pi pi pi pi pi pi pi<br>pi pi pi pi pi pi pi pi |
| D | clr d2　　　　cmp 0, d0<br>sub a0,a1　　mov a1, sp |
| E | pi pi pi pi pi pi pi pi<br>pi pi pi pi pi pi pi pi |
| F | pi pi pi pi pi pi pi pi<br>pi pi pi pi pi pi pi pi |

FIG. 31

| Page | Transfer management flag |
|---|---|
| A | 1 |
| B | 0 |
| C | 0 |
| D | 1 |
| E | 0 |
| F | 0 |

| Page | | |
|---|---|---|
| A | mov 1, d0 | add d1, d0 |
| | call memcpy | jmp 800 |
| B | mov d0, a1 | mov a1, (a0) |
| | call 100, a0 | bra 140 |
| C | pi pi pi pi pi pi pi pi | |
| | pi pi pi pi pi pi pi pi | |
| D | clr d2 | cmp 0, d0 |
| | sub a0,a1 | mov a1, sp |
| E | pi pi pi pi pi pi pi pi | |
| | pi pi pi pi pi pi pi pi | |
| F | pi pi pi pi pi pi pi pi | |
| | pi pi pi pi pi pi pi pi | |

FIG. 33

| Page | Transfer management flag |
|------|--------------------------|
| A | 1 |
| B | 1 |
| C | 0 |
| D | 1 |
| E | 0 |
| F | 0 |

| Page | | |
|---|---|---|
| A | mov 1, d0<br>call memcpy | add d1, d0<br>jmp 800 |
| B | mov d0, a1<br>call 100, a0 | mov a1, (a0)<br>bra 140 |
| C | mov 1, d0<br>call memcpy | add d1, d0<br>jmp 800 |
| D | clr d2<br>sub a0, a1 | cmp 0, d0<br>mov a1, sp |
| E | pi pi pi pi pi pi pi pi<br>pi pi pi pi pi pi pi pi | |
| F | pi pi pi pi pi pi pi pi<br>pi pi pi pi pi pi pi pi | |

FIG. 35

| Page | Transfer management flag |
|---|---|
| A | 1 |
| B | 1 |
| C | 1 |
| D | 1 |
| E | 0 |
| F | 0 |

| Page | | | |
|---|---|---|---|
| A | mov 1, d0<br>call memcpy | add d1, d0<br>jmp 800 | ① |
| B | mov d0, a1<br>call 100, a0 | mov a1, (a0)<br>bra 140 | ④ |
| C | mov 1, d0<br>call memcpy | add d1, d0<br>jmp 800 | ⑤ |
| D | clr d2<br>sub a0,a1 | cmp 0, d0<br>mov a1, sp | ② |
| E | mov 1, d0<br>call memcpy | add d1, d0<br>jmp 800 | ③ |
| F | mov d0, a1<br>call 100, a0 | mov a1, (a0)<br>bra 140 | ⑥ |

| Page | | |
|---|---|---|
| A | mov 1, d0 | add d1, d0 |
|   | call memcpy | jmp 800 |
| B | pi pi pi pi | pi pi pi pi |
|   | pi pi pi pi | pi pi pi pi |
| C | pi pi pi pi | pi pi pi pi |
|   | pi pi pi pi | pi pi pi pi |
| D | clr d2 | cmp 0, d0 |
|   | sub a0,a1 | mov a1, sp |
| E | mov 1, d0 | add d1, d0 |
|   | call memcpy | jmp 800 |
| F | pi pi pi pi | pi pi pi pi |
|   | pi pi pi pi | pi pi pi pi |

| Page | | | |
|---|---|---|---|
| A | mov 1, d0<br>call memcpy | add d1, d0<br>jmp 800 | PSW.IM = 7 |
| B | mov d0, a1<br>call 100, a0 | mov a1, (a0)<br>bra 140 | PSW.IM = 0 |
| C | mov 1, d0<br>call memcpy | add d1, d0<br>jmp 800 | PSW.IM = 2 |
| D | clr d2<br>sub a0, a1 | cmp 0, d0<br>mov a1, sp | PSW.IM = 7 |
| E | mov 1, d0<br>call memcpy | add d1, d0<br>jmp 800 | PSW.IM = 7 |
| F | mov d0, a1<br>call 100, a0 | mov a1, (a0)<br>bra 140 | PSW.IM = 7 |

| Page | Interrupt prohibition state |
|---|---|
| A | 0 |
| B | 1 |
| C | 1 |
| D | 0 |
| E | 0 |
| F | 0 |

| Page | Transfer management flag | Interrupt prohibition state |
|---|---|---|
| A | 0 | 0 |
| B | 0 | 1 |
| C | 0 | 1 |
| D | 0 | 0 |
| E | 0 | 0 |
| F | 0 | 0 |

| Page | | |
|---|---|---|
| A | pi pi pi pi pi pi pi pi | pi pi pi pi pi pi pi pi |
| B | mov d0, a1 | mov a1, (a0) |
|   | call 100, a0 | bra 140 |
| C | mov 1, d0 | add d1, d0 |
|   | call memcpy | jmp 800 |
| D | pi pi pi pi pi pi pi pi | pi pi pi pi pi pi pi pi |
| E | pi pi pi pi pi pi pi pi | pi pi pi pi pi pi pi pi |
| F | pi pi pi pi pi pi pi pi | pi pi pi pi pi pi pi pi |

202

START CONTROL APPARATUS FOR CONTROLLING A START OF AN INFORMATION DEVICE BY USING AN INTERRUPT GENERATION CODE, INFORMATION DEVICE, AND START CONTROL METHOD

CROSS REFERENCE TO RELATED APPLICATIONS

This is a continuation application of PCT International Application No. PCT/JP2011/007056 filed on Dec. 16, 2011, designating the United States of America, which is based on and claims priority of Japanese Patent Application No. 2011-018653 filed on Jan. 31, 2011. The entire disclosures of the above-identified applications, including the specifications, drawings and claims are incorporated herein by reference in their entirety.

FIELD

The present disclosure relates to a start control apparatus or the like which controls an information device including a non-volatile memory which stores instructions and a volatile memory that is accessible faster than the non-volatile memory.

BACKGROUND

Conventionally, apparatuses for reducing the time from power activation to system start have been proposed.

For example, a quick starting apparatus disclosed in Patent Literature 1, at the first system boot, monitors access to a main storage apparatus from a cache memory, obtains access time from power activation to an access operation and an address of the main storage to be accessed, and generates the obtained access time and address as table data. The quick starting apparatus, at the second and subsequent system boot, reads data from an address of the main storage corresponding to a relevant address of the table data according to a sequence of the access time included in the table data, and writes the read data into the cache memory. In other words, when an initialization program is executed for the second time or later, the quick starting apparatus, by referring to the access time included in the table data generated in the previous execution, sequentially reads data from the address of the main storage corresponding to the address included in the table data and writes the data into the cache memory. Therefore, access from the CPU to the main storage does not occur, the execution of the initialization program is faster, and the start time of the system can be reduced.

Moreover, in a program start control device disclosed in Patent Literature 2, a DMA control unit reads a system start program from a flash memory, and directly transfers the read system start program to an external memory. Moreover, when the transfer of the system start program is completed by the DMA control unit, the CPU performs system start according to the system start program read from the external memory. Meanwhile, simultaneously in parallel to the system start, the DMA control unit reads the system control program from the flash memory, and transfers the read system control program to the external memory. As described above, since the system start operation and the program read operation are performed simultaneously in parallel, it is possible to reduce the start time of the system.

CITATION LIST

Patent Literature

[PTL1] Japanese Unexamined Patent Application Publication No. 2010-231701
[PTL2] Japanese Unexamined Patent Application Publication No. 2008-65434
[PTL3] Japanese Unexamined Patent Application Publication No. 2008-135051

SUMMARY

Technical Problem

However, in the quick starting apparatus disclosed in Patent Literature 1, control is performed for quickening the system start based on the table data generated at the previous system start. Therefore, there is a problem that it is impossible to quicken the start when the system makes the first start. Moreover, in the case where access is performed in an access sequence different from the sequence of access, at the time of the previous system start, from the cache memory to the main storage even when the second or subsequent system start is made, there is a problem that a cache miss occurs and it is impossible to quicken the start.

Moreover, in the program start control apparatus disclosed in Patent Literature 2, the system start program is executed by prioritizing the transfer of the system start program to the external memory over the transfer of the system control program to the external memory, with the result that the system start is quickening. For the quickening, the system start program and the system control program need to be segmented in advance. However, there is a problem that the segmentation of the program is difficult in a large-scale system.

In an electronic device, a data processing method, and a computer program disclosed in Patent Literature 3, when an access is detected to an area on which data copy is not performed, data copy is performed through an NMI interrupt handler process. However, there is a problem that it is impossible to detect the access if a memory protection unit such as Memory Management Unit is not implemented as hardware.

The present disclosure is conceived in order to solve the above mentioned problems, and an object of the disclosure is to provide a start control apparatus or the like which does not have to segment a program according to a program type and is capable of quicken the system start from when the system makes the first start.

Solution to Problem

In order to achieve the above mentioned goal, a start control apparatus according to an aspect of the present disclosure is a start control apparatus for controlling a start of an information device which includes a non-volatile memory storing a plurality of instructions and a volatile memory that is accessible faster than the non-volatile memory, the start control apparatus comprising: a code write unit configured to write an interrupt generation code into a page in which the instructions stored in the non-volatile memory are not written, among a plurality of the pages included in an instruction area that is an area of the volatile memory into which the instructions are written, the interrupt generation code being a code for generating a software interrupt; an instruction transfer unit configured to transfer the instructions from the non-volatile memory to a corresponding page of the volatile memory that is a page in which the interrupt generation code generating the software interrupt is stored when the software interrupt is generated by the interrupt generation code, the instructions being to be stored in the corresponding page; and an instruction execution unit configured to execute the instructions stored in the instruction area, and when the interrupt generation code is executed, generate a software interrupt.

With this configuration, the code write unit writes an interrupt generation code into a page into which the instruction is not written, among pages that are included in the instruction area. Therefore, when the instruction is stored in the instruction area, the instruction is executed. When the instruction is not stored in the instruction area, a software interrupt occurs due to the execution of the code. In the software interrupt process, the instruction is transferred to the corresponding page. Therefore, after the interrupt process, the instruction can be executed normally. As described above, the instruction execution and the instruction transfer can be performed simultaneously in parallel. Therefore, the program does not have to be segmented according to a program type, and it is possible to quicken the system start from when the system makes the first start. It is to be noted that the system is an information device.

Favorably, the volatile memory further stores transfer management table data showing a page which is included in the instruction area and in which the instructions have already been transferred from the non-volatile memory to the volatile memory, and the instruction transfer unit, when it is able to determine that the instructions are not transferred to the corresponding page by referring to the transfer management table data when the software interrupt is generated, is configured to: transfer the instructions to be stored in the corresponding page from the non-volatile memory to the corresponding page of the volatile page; and update the transfer management table data.

With this configuration, it can be determined whether or not the instruction is transferred, by referring to the transfer management table data. For example, there is a case where an interrupt generation code is embedded in the program for a purpose different from that for designating a breakpoint in debugging. In this case, although it is not necessary to transfer the instruction by executing the code in the breakpoint, the instruction is transferred when there is no means for determining whether or not the instruction is transferred. In this case, it can be appropriately determined whether or not the instruction is to be transferred, by referring to the transfer management table data.

Moreover, the instruction transfer unit may be configured to (i) transfer, from the non-volatile page to the corresponding page of the volatile memory, the instructions to be stored in the corresponding page when a software interrupt is generated by the interrupt generation code located in a page to which the instructions are not transferred, and write the interrupt generation code into an instruction located across a boundary between the corresponding page and a page located immediately after the corresponding page, when the instructions are not transferred to the page located immediately after the corresponding page, and (ii) transfer the instructions to be stored in a page immediately after the located instruction, from the non-volatile memory to the page of the volatile memory which is immediately after the located instruction, when the software interrupt is generated by the interrupt generation code written into the located instruction.

Specifically, the volatile memory further stores transfer management table data showing (i) a page which is included in the instruction area and in which the instructions have already been transferred from the non-volatile memory to the volatile memory, and (ii) an address, in the volatile memory, of a page boundary instruction that is an instruction located across a boundary between two pages, and the instruction transfer unit includes: a transfer unit configured to (i) determine the corresponding page as a page to be transferred when it is able to be determined that the instructions are not transferred to the corresponding page by referring to the transfer management table data when the software interrupt is generated, (ii) determine the page located immediately after the corresponding page as a page to be transferred when it is able to determine that the instructions have already been transferred to the corresponding page by referring to the transfer management table data when the software interrupt is generated, and (iii) transfer the instructions to be stored in the corresponding page determined as the page to be transferred or the page located immediately after the corresponding page, from the non-volatile memory to the page to be transferred of the volatile memory, and update the transfer management table data; a first code write unit configured to write an interrupt generation code into an address of a page boundary instruction of the page to be transferred when it is able to determine that the address of the page boundary instruction is included in an address of the page to be transferred and the instructions are not transferred to a following page, by referring to the transfer management table data after a process by the transfer unit, the following page being a page located immediately after the page to be transferred; and a second code write unit configured to write a page boundary instruction into an address of the page boundary instruction of a previous page when it is able to determine that the address of the page boundary instruction is included in an address of the previous page and the instructions have already been transferred to the previous page, by referring to the transfer management table data after the process by the transfer unit, the previous page being a page located immediately before the page to be transferred.

When the instruction is not transferred to the adjacent page in the case where the instruction is transferred to the page to be transferred, the page boundary instruction located across between the page to be transferred and the neighboring page is an instruction different from that of the original page boundary. Therefore, it is possible to prevent the execution of an erroneous page boundary instruction by storing an interrupt generation code in the address of the page boundary instruction.

Moreover, when the instruction execution unit is in an idle state, the instruction transfer unit may be further configured to transfer instructions to be stored in a page to which the instructions are not transferred, from the non-volatile memory to a page of the volatile memory to which the instructions are not transferred.

Specifically, the volatile memory further stores transfer management table data showing a page which is included in the instruction area and in which the instructions have already been transferred from the non-volatile memory to the volatile memory, and the instruction transfer unit is further configured to detect a page to which the instructions are not transferred, by referring to the transfer management table data when the instruction execution unit is in an idle state, transfer the instructions to be stored in the detected page from the non-volatile memory to the detected page of the volatile memory, and update the transfer management table data.

By transferring the instruction in advance when the instruction execution unit is in an idle state, the number of software interrupts can be reduced. Therefore, the system start can be quickened.

Moreover, the volatile memory further stores transfer management table data showing (i) a page which is included in the instruction area and in which the instructions have already been transferred from the non-volatile memory to the volatile memory, and (ii) a transfer sequence of instructions on a page-by-page basis from the non-volatile memory to the volatile memory, and the instruction transfer unit, by referring to the transfer management table data, when the instruction execution unit is in an idle state or before the instructions are executed, may be configured to (i) transfer the instructions to be stored in a page to which the instructions are not transferred, from the non-volatile memory to a page of the volatile memory to which the instructions are not transferred, according to a transfer sequence indicated by the transfer management table data, and (ii) update the transfer management table data.

By transferring the instruction according to the sequence of transfer from the non-volatile memory to the volatile memory, a transfer of the instruction in advance can be performed effectively in the program in which the instruction execution sequence is determined to some extent. In other words, the number of software interrupts caused by the execution of another interrupt generation code instead of the transferred instruction in advance can be reduced, and the advanced transferred instruction is executed at an early stage after the transfer of the instruction, with the result that the system start can be quickened.

Moreover, the volatile memory further stores transfer management table data showing (i) a page which is included in the instruction area and in which the instructions have already been transferred from the non-volatile memory to the volatile memory, and (ii) an interrupt prohibition state indicating, on a page-by-page basis, whether or not an interrupt is prohibited when the instructions are transferred from the non-volatile memory to the volatile memory, and the instruction transfer unit, by referring to the transfer management table data before instructions to be stored in an interrupt prohibition page are executed, may be configured to (i) transfer the instructions to be stored in the interrupt prohibition page from the non-volatile memory to the interrupt prohibition page of the volatile memory, and (ii) update the transfer management table data, the interrupt prohibition page being a page in which an interrupt is prohibited when the instructions are transferred.

By transferring the instruction stored in the interrupt prohibition page before the instruction is executed, it is possible to prevent degradation in responsiveness caused by the original period of the interrupt prohibition period, the software interrupt process, an amount of transfer process performed in the software interrupt process when the software interrupt occurs due to the execution of the interrupt generation code. Therefore, it is possible to quicken the system start without degrading the system interrupt responsiveness.

Moreover, the above described start control apparatus may include an interrupt process program transfer unit configured to write a program of a process performed by the instruction transfer unit into the volatile memory, before the process is started by the instruction transfer unit.

Moreover, the interrupt generation code may be a software interrupt instruction included in an instruction set implemented in the instruction execution unit.

Moreover, the interrupt generation code may be an undefined code which causes exception handling and is not included in an instruction set implemented in the instruction execution unit.

The transfer process of the instruction can be treated as exception handling.

Moreover, the above described start control apparatus may include a data transfer unit configured to transfer constant data stored in the non-volatile memory to the volatile memory, before the instructions are executed by the instruction execution unit.

An information device according to another aspect of the present disclosure includes: a non-volatile memory storing a plurality of instructions; a volatile memory accessible faster than the non-volatile memory; and the above described start control apparatus.

With this configuration, the code write unit writes an interrupt generation code into a page in which the instruction is not written among pages that are included in the instruction area. Therefore, when the instruction is stored in the instruction area, the instruction is executed. When the instruction is not stored in the instruction area, a software interrupt occurs due to the execution of the code. In the software interrupt process, the instruction is transferred to the corresponding page. Therefore, after the interrupt process, the instruction can be executed normally. As described above, since the instruction execution and the instruction transfer can be performed in parallel, they can be performed simultaneously in parallel. Therefore, the program does not have to be segmented according to a program type, and it is possible to quicken the system start from when the system makes the first start. It is to be noted that the system is an information device. The information device may be an apparatus which transfers the instructions stored in a non-volatile memory to a volatile memory and then executes the instructions, such as a digital still camera, a digital television, a mobile phone, a personal digital assistant (PDA), and the like.

It is to be noted that the present disclosure can be implemented not only as a transfer control apparatus including these characteristic processing units but also as a transfer control method in which the processes performed by the characteristic processing units included in the transfer control apparatus are determined as steps. Moreover, the present disclosure can also be implemented as a program for causing a computer to function as the characteristic processing units included in the transfer control apparatus, or a program for causing the computer to perform the characteristic steps included in the transfer control method. It goes without saying that the program can be distributed via a non-transitory computer-readable storage medium such as CD-ROM and a communication network such as the Internet.

Advantageous Effects

In the present disclosure, the program does not have to be segmented according to a program type, and it is possible to quicken the system start from when the system makes the first start.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 is a diagram for explaining a write process of software interrupt instruction performed by the code write unit.

FIG. 7 is a diagram showing an example of instructions stored in the instruction area.

FIG. 9 is a diagram showing an example of instructions stored in the instruction area.

FIG. 11 is a diagram showing an example of the transfer management table data.

FIG. 13 is a diagram showing an example of the transfer management table data.

FIG. 15 is a diagram showing an example of the transfer management table data.

FIG. 16 is a diagram showing an example of the transfer management table data.

FIG. 19 is a diagram showing an example of the transfer management table data.

FIG. 20 is a diagram showing an example of the boundary instruction address data.

FIG. 26 is a diagram showing an example of the transfer management table data.

FIG. 27 is a diagram showing an example of the transfer management table data.

FIG. 28 is a diagram showing an example of the transfer management table data.

FIG. 30 is a diagram showing an example of instructions stored in the instruction area.

FIG. 31 is a diagram showing an example of the transfer management table data.

FIG. 32 is a diagram showing an example of instructions stored in the instruction area.

FIG. 33 is a diagram showing an example of the transfer management table data.

FIG. 34 is a diagram showing an example of an instruction stored in the instruction area.

FIG. 35 is a diagram showing an example of the transfer management table data.

FIG. 38 is a diagram showing an example of a transfer sequence of the instructions.

FIG. 44 is a diagram showing an example of the instructions stored in the instruction area.

FIG. 48 is a diagram showing an example of the case where an interrupt is prohibited when instructions are transferred.

FIG. 49 is a diagram showing an example of the data in which an interrupt is prohibited.

FIG. 51 is a diagram showing an example of the transfer management table data.

FIG. 52 is a diagram showing an example of the instructions stored in the instruction area after all the instructions are transferred to the interrupt prohibition page.

DESCRIPTION OF EMBODIMENTS

The following will describe an information device according to embodiments of the present disclosure. It is to be noted that the embodiments to be described later are favorable specific examples in the present disclosure. The numerical values, structural elements, arrangement and connection of the structural elements, steps, and the processing order of the steps are mere examples, and they are not intended to limit the present disclosure. The present disclosure is limited only by the scope of the appended Claims. Therefore, among the structural elements in the following embodiments, structural elements not recited in any one of the independent claims are not necessarily needed to achieve the goal of the present disclosure, but are described as those comprising a more favorable embodiment.

Embodiment 1

Figure 1:
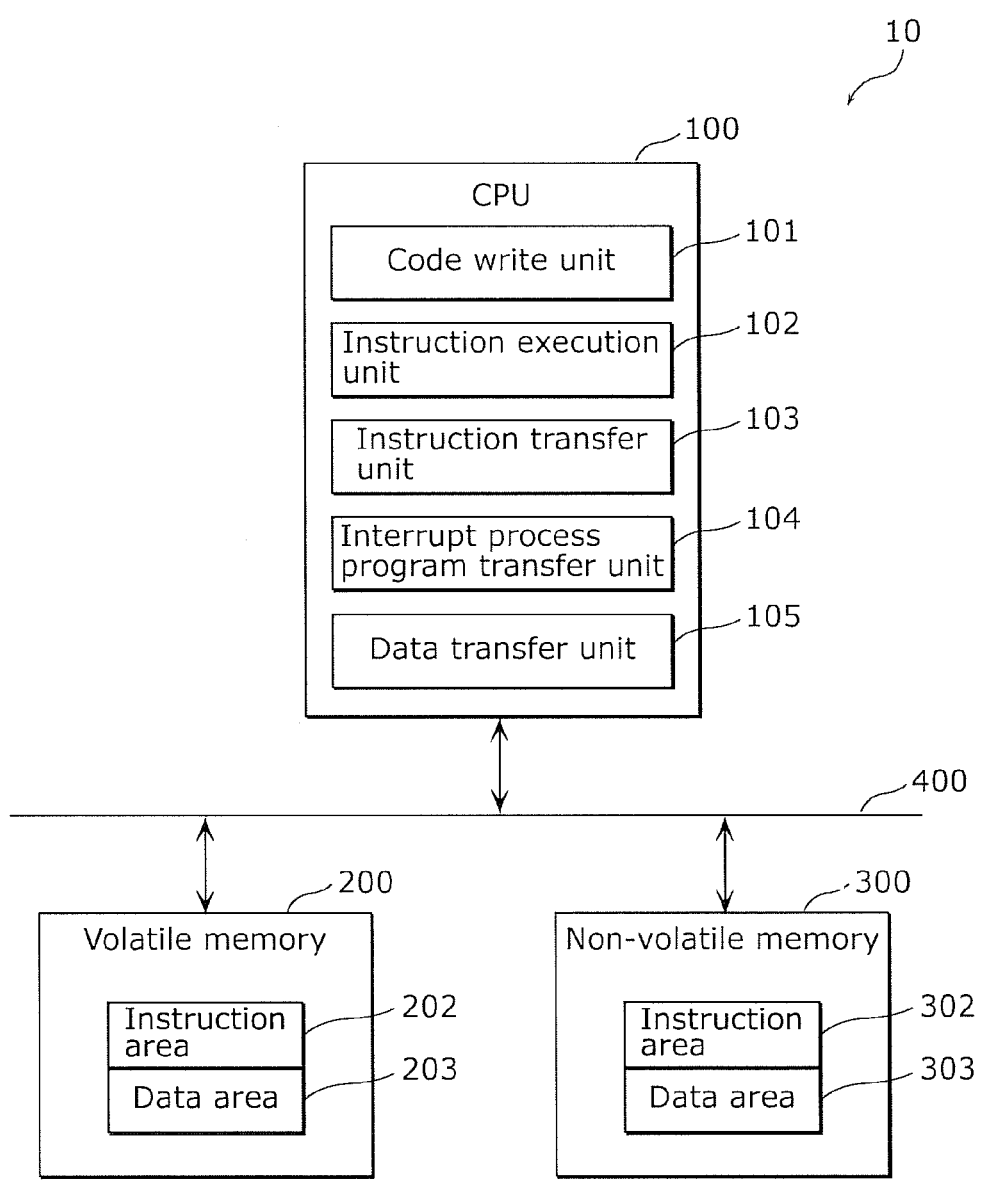
FIG. 1 is a block diagram showing a functional configuration of an information device according to Embodiment 1 of the present disclosure.

FIG. 1 is a block diagram showing a functional configuration of an information device according to Embodiment 1 of the present disclosure.

An information device 10 is an apparatus which executes a program, and the information device 10 includes a CPU 100, a volatile memory 200, and a non-volatile memory 300. The CPU 100, the volatile memory 200, and the non-volatile memory 300 are connected to each other via a bus 400.

The CPU 100 is a processing unit which executes the program, and plays a role as a start control apparatus which controls the start of the information device 10. The volatile memory 200 is a volatile memory which stores the program executed by the CPU 100. The volatile memory 200 includes a dynamic random access memory (DRAM). The non-volatile memory 300 is a non-volatile memory which stores a program transferred to the volatile memory 200 and executed by the CPU 100. The non-volatile memory 300 includes a NAND flash memory or a NOR flash memory. The volatile memory 200 is accessible faster than the non-volatile memory 300.

The volatile memory 200 includes an instruction area 202 and a data area 203. The instruction area 202 stores the instructions executed by an instruction execution unit 102 of the CPU 100, and the data area 203 stores the data to be accessed by the program executed by the instruction execution unit 102 of the CPU 100.

The non-volatile memory 300 includes an instruction area 302 and a data area 303. The instruction area 302 stores instructions transferred to the instruction area 202 in the program executed by the instruction execution unit 102 of the CPU 100, and the data area 303 stores the data transferred to the data area 203 in the program executed by the instruction execution unit 102 of the CPU 100.

The CPU 100 functionally includes a code write unit 101, an instruction execution unit 102, an instruction transfer unit 103, an interrupt process program transfer unit 104, and a data transfer unit 105. In other words, the program execution by the CPU 100 allows each of the processes to play the roles as the code write unit 101, the instruction execution unit 102, the instruction transfer unit 103, the interrupt process program transfer unit 104, and the data transfer unit 105.

The code write unit 101 writes an interrupt generation code that is a code for generating a software interrupt, into the page into which the instructions are not written, among the pages included in the instruction area 202 which is an area of the volatile memory 200 into which the instructions stored in the non-volatile memory 300 are written.

The instruction execution unit 102 executes the instructions stored in the instruction area 202, and generates a software interrupt when the interrupt generation code is executed.

The instruction transfer unit 103 transfers the page to be stored in the corresponding page that is the page in which the interrupt generation code generating the software interrupt is stored, from the non-volatile memory 300 to the corresponding page of the volatile memory, when the software interrupt is generated by the interrupt generation code.

The interrupt process program transfer unit 104 writes the program executed by the instruction transfer unit 103 into the volatile memory 200, before the process is executed by the instruction transfer unit 103.

The data transfer unit 105 transfers constant data stored in the non-volatile memory 300 to the volatile memory 200 before the instruction is executed by the instruction execution unit 102.

The following will describe the process performed at the start by the information device 10 with reference to specific examples.

Figure 2:
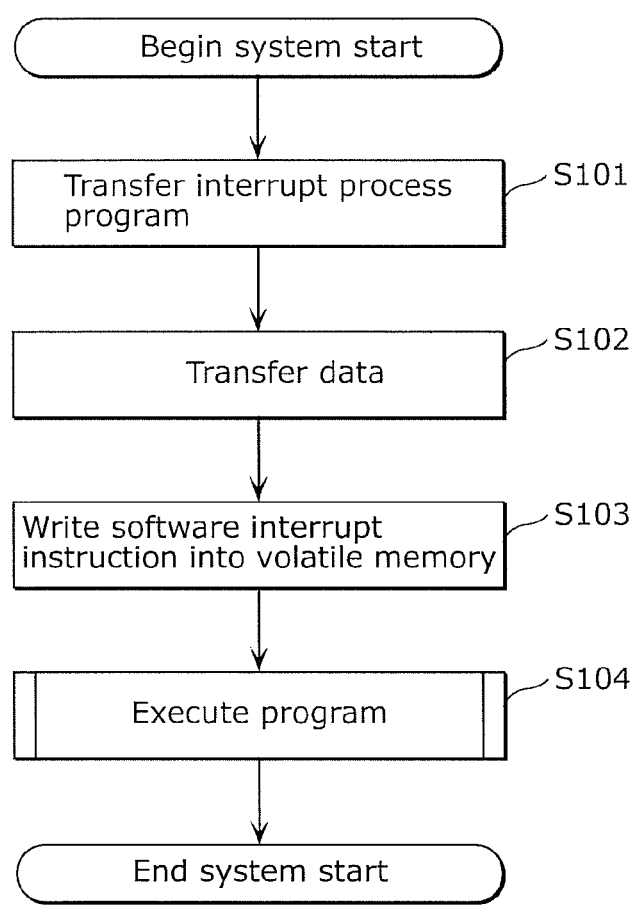
FIG. 2 is a flowchart of a process performed when the information device starts.

FIG. 2 is a flowchart of a process performed when the information device 10 starts.

When a power source is pumped into the information device 10, the interrupt process program transfer unit 104 writes the program of the process executed by the instruction transfer unit 103 into the volatile memory 200 before the start of the process by the instruction transfer unit 103 (S101). The process performed by the instruction transfer unit 103 will be described in details later. The program of the process executed by the instruction transfer unit 103 is stored in the non-volatile memory 300, and the interrupt process program transfer unit 104 may transfer the program from the non-volatile memory 300 to the volatile memory 200. Moreover, the program of the process executed by the instruction transfer unit 103 is stored in a ROM or a flash memory in the information device 10, and the interrupt process program transfer unit 104 may transfer the program from the ROM to the volatile memory 200.

Figure 3:
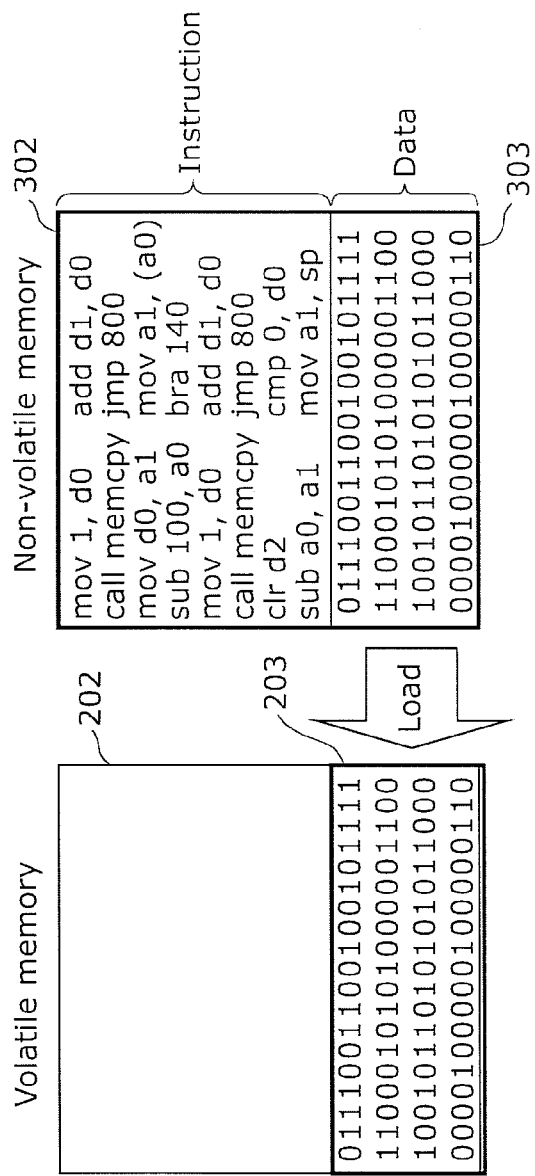
FIG. 3 is a diagram for explaining a data transfer process performed by the data transfer unit.

Next, the data transfer unit 105 transfers the constant data stored in the non-volatile memory 300 to the volatile memory 200 before the instruction is executed by the instruction execution unit 102 (S102). As shown in FIG. 3, the instruction area 302 of the non-volatile memory 300 stores the instructions to be transferred to the instruction area 202 in the program executed by the instruction execution unit 102 of the CPU 100. The data area 303 stores the data to be transferred to the data area 203 in the program executed by the instruction execution unit 102 of the CPU 100. The data transfer unit 105 reads, among them, the data stored in the data area 303, and then writes the read data into the data area 203 of the volatile memory 200. The data written into the data area 203 includes constant data such as data on initial value of variables. At this time, no instruction is written into the instruction area 202.

By referring to FIG. 2 again, the code write unit 101 writes interrupt generation codes into the page into which the instructions are not written among the pages included in the instruction area 202 that is an area of the volatile memory 200 into which the instructions stored in the non-volatile memory 300 are written (S103). In the following description, the interrupt generation code is determined as the software interrupt instruction included in an instruction set implemented in the instruction execution unit 102 (the CPU 100).

As shown in FIG. 3, it is assumed that no instruction is written into the instruction area 202. In this case, as shown in FIG. 4, the code write unit 101 writes the software interrupt instruction into all the pages (for example, pages A to F) of the instruction area 202. In the following description, it is determined that the software interrupt instruction is indicated with "pi" and the software interrupt instruction pi is typically the instruction of the minimum instruction length that can be expressed in the instruction set. Hereinafter, the software interrupt instruction pi will be described as a one byte instruction indicated by a machine code "ff". The code write unit 101 writes the software interrupt instruction pi into all bytes on pages A to F. It is to be noted that when no other programs or data are stored in advance in part of the instruction area 202, the software interrupt instruction pi is not written into the part. Moreover, in the instruction stored in the instruction area 302 of the non-volatile memory 300, the software interrupt instruction pi does not appear.

By referring to FIG. 2 again, the instruction execution unit 102 executes the instructions stored in the instruction area 202, and generates a software interrupt when the interrupt generation instruction pi is executed (S104). Details of the program execution process (S104) will be described later.

Figure 5:
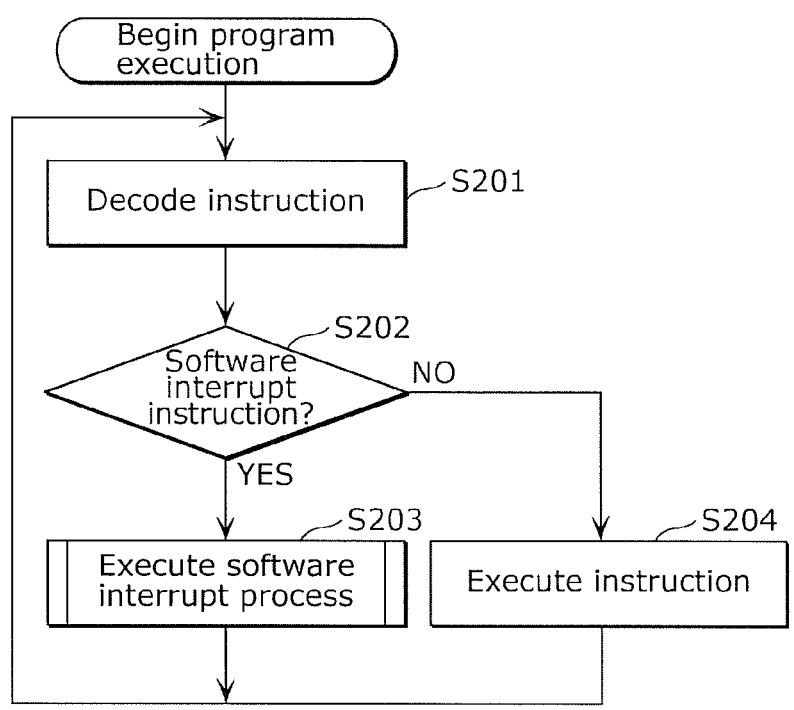
FIG. 5 is a detailed flowchart of a program execution process (S104 in FIG. 2).

FIG. 5 is a detailed flowchart of the program execution process (S104 in FIG. 2).

The instruction execution unit 102 decodes the instruction stored in the address of the volatile memory 200 indicated by a program counter (S201).

When the decoded instruction is the software interrupt instruction pi (YES in S202), the instruction execution unit 102 generates a software interrupt and responds to the software interrupt, while the instruction transfer unit 103 performs the software interrupt process (S203).

Figure 6:
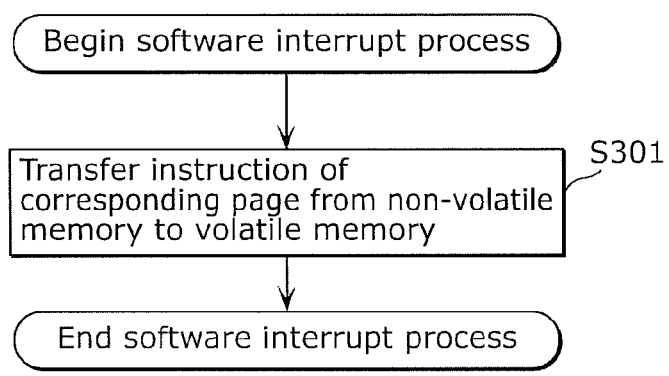
FIG. 6 is a detailed flowchart of a software interrupt process (S203 in FIG. 5).

FIG. 6 is a detailed flowchart of the software interrupt process (S203 in FIG. 5).

The instruction transfer unit 103, when the software interrupt is generated by the software interrupt instruction pi, transfers the instructions to be stored in the corresponding page that is a page in which the software interrupt instructions pi generating the software interrupts are stored, from the non-volatile memory 300 to the corresponding page of the volatile memory (S301).

Figure 8:
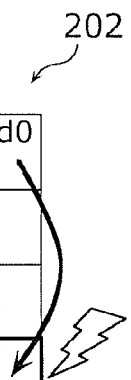
FIG. 8 is a diagram showing an example of instructions stored in the instruction area.

For example, as shown in FIG. 7, it is assumed that the instructions have already been transferred to page A of the instruction area 202 and the software interrupt instructions pi are written into the other pages (pages B to F). In this state, a program counter jumped from page A to page D with jmp instruction located at the end of page A. Then, as shown in FIG. 8, since the software interrupt instruction pi on page D is decoded, the instruction execution unit 102 generates a software interrupt. In response to the software interrupt, the instruction transfer unit 103 transfers the instructions to page D, with the result that the instructions are transferred to page D as shown in FIG. 9.

In the present embodiment, a value of the program counter is written into a stack when the software interrupt is generated and the value written on the stack is written back from the stack to the program counter after the software interrupt process is completed. However, when a register is prepared for evacuating the program counter, the saving and restoration may be performed using the register. By referring to FIG. 5 again, after the software interrupt process (S203), the instruction decoding process (S201) and the following processes are repeated until the program ends. In other words, since the program counter stores the address in which the software interrupt instruction pi performing the software interrupt has been stored, the process resumes from the decoding of the instructions stored in the address.

When the decoded instruction is a normal instruction (NO in S202), the instruction execution unit 102 execute the decoded instruction (S204). After the instruction execution, the value of the program counter is rewritten into the address of the next instruction. Subsequently, the instruction code process (S201) and the following processes are repeated until the program ends.

As described above, in the information device 10 according to Embodiment 1, the code write unit 101 writes the interrupt generation code (software interrupt instruction pi) into a page in which no interrupt is written among pages included in the instruction area 202. Therefore, when the instruction other than the software interrupt instruction pi is stored in the instruction area 202, the instruction is executed. However, when the software interrupt instruction pi is stored in the instruction area 202, the software interrupt is generated by the execution of the above described software interrupt instruction pi. In the software interrupt process, the instruction is transferred to the corresponding page. Therefore, after the interrupt process, the instruction can be executed normally. As described above, the instruction execution and the instruction transfer can be performed simultaneously in parallel. Therefore, the program does not have to be segmented according to a program type, and it is possible to quicken the system start from when the system makes the first start.

It is to be noted that the code write unit 101, the instruction transfer unit 103, the interrupt process program transfer unit 104, the data transfer unit 105 do not necessarily have to be implemented as hardware in the CPU, and they may be implemented as software which performs the same functions.

Embodiment 2

The following will describe an information device according to Embodiment 2 of the present disclosure.

In Embodiment 1, in the instructions stored in the instruction area 302 of the non-volatile memory 300, the software interrupt instruction pi does not appear. Meanwhile, in Embodiment 2, in the instructions stored in the instruction area 302 of the non-volatile memory 300, the software interrupt instruction pi may appear. The case is assumed where a software interrupt instruction pi is embedded in the program for a purpose different from that for generating an interrupt such as the purpose for designating a breakpoint in debugging. In other words, the difference from Embodiment 1 is that by using the transfer management table to be described later, it is determined whether or not the software interrupt instruction pi that is the execution target is written into the code write unit 101 for generating an interrupt.

Figure 10:
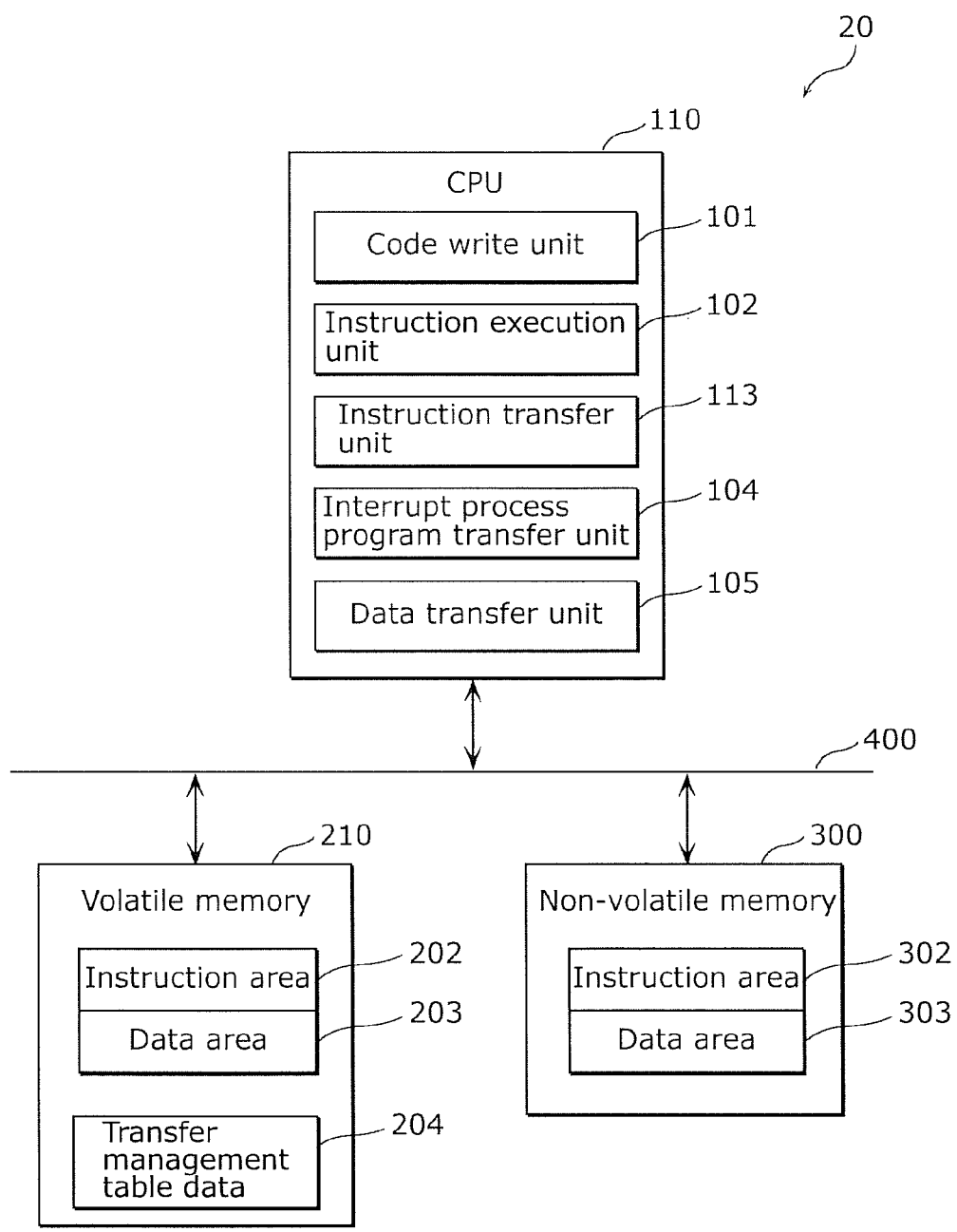
FIG. 10 is a block diagram showing a functional configuration of an information device according to Embodiment 2 of the present disclosure.

FIG. 10 is a block diagram showing a functional configuration of an information device according to Embodiment 2 of the present disclosure. In the following description, the same reference numerals are assigned to the same structural elements as those in Embodiment 1. Since the functions and names are the same as those in Embodiment 1, a description thereof will be omitted where appropriate.

An information device 20 is an apparatus which executes a program, and the information device 11 includes a CPU 110, a volatile memory 210, and a non-volatile memory 300. The CPU 110, the volatile memory 210, and the non-volatile memory 300 are connected to each other via the bus 400.

The CPU 110 is a processing unit which executes the program, and plays a role as a start control apparatus which controls the start of the information device 20. The volatile memory 210 is a volatile memory which stores the program executed by the CPU 110. The volatile memory 210 includes a dynamic random access memory (DRAM). The volatile memory 210 is accessible faster than the non-volatile memory 300.

The volatile memory 210 includes the instruction area 202 and the data area 203. The volatile memory 210 also stores transfer management table data 204. The transfer management table data 204 is data showing pages which are included in the instruction area 202 and in which the instructions have already been transferred from the non-volatile memory 300 to the volatile memory 200. FIG. 11 is a diagram showing an example of the transfer management table data 204. The transfer management table data 204 stores a transfer management flag on a page-by-page basis. A page having the transfer management flag 1 indicates that the instructions have already been transferred from the non-volatile memory 300 to the volatile memory 200. A page having the transfer management flag 0 indicates that the instructions are not transferred from the non-volatile memory 300 to the volatile memory 200. In the example of FIG. 11, pages A, B, E, and F indicates that the instructions have already been transferred from the non-volatile memory 300 to the volatile memory 200, and pages C and D indicate that the instructions are not transferred from the non-volatile memory 300 to the volatile memory 200. The transfer management table data 204 is not limited to the example of FIG. 10. For example, the transfer management table data 204 may include the page names in which the instructions have been already transferred and may include only the page names in which the instructions are not transferred.

The CPU 110 includes the code write unit 101, the instruction execution unit 102, an instruction transfer unit 113, an interrupt process program transfer unit 104, and a data transfer unit 105. When it is able to be determined that the instruction is not transferred to the corresponding page that is a page storing the interrupt generation code that is a code generating the software interrupt by referring to the transfer management table data 204 when a software interrupt is generated by the software interrupt instruction pi, the instruction transfer unit 113 transfers the instruction to be stored in the corresponding page from the non-volatile memory 300 to the volatile memory 200 and then updates the transfer management table data 204.

The following will describe the process performed at the start by the information device 20 with reference to specific examples. In the following description, the numbers similar to those in Embodiment 1 are assigned to the steps similar to those in Embodiment 1. A description will be omitted thereof where appropriate.

Figure 12:
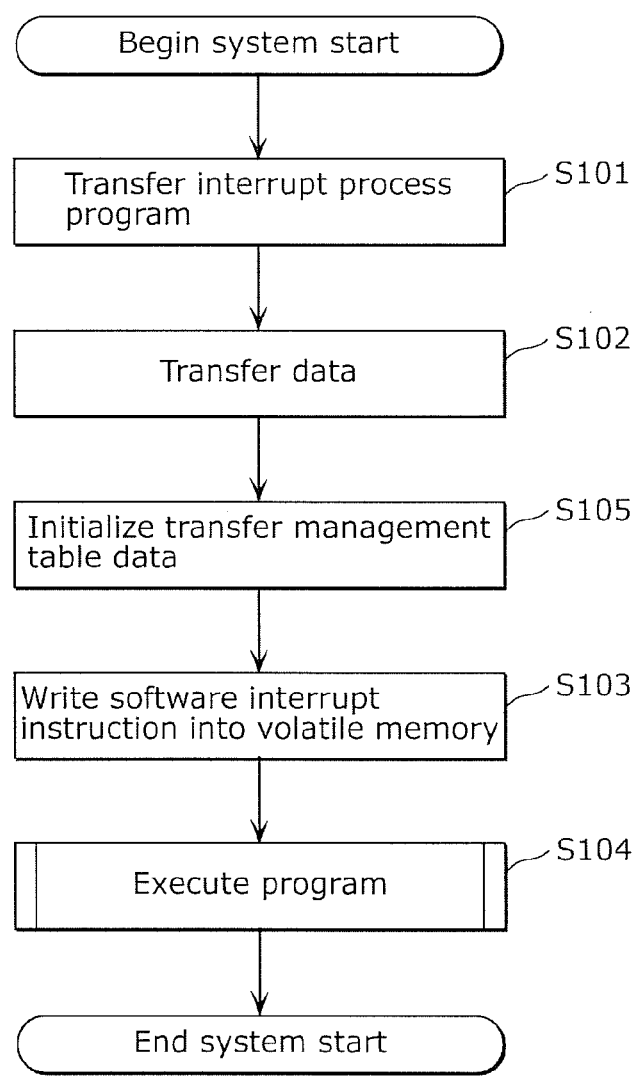
FIG. 12 is a flowchart of a process performed when the information device starts.

FIG. 12 is a flowchart of a process performed when the information device 20 starts.

The flow of the processes is similar to that at the start of the information device 10 shown in FIG. 2. However, until the program execution process starts (S104), the instruction execution unit 102 initializes the transfer management table data 204 (S105). In other words, the instruction execution unit 102 sets, to 0, a transfer management flag of the page in which the instructions are not transferred in the transfer management table data 204. For example, when the instruction area 202 includes pages A to F and the instructions are not transferred to all the pages, the instruction execution unit 102 sets, to 0, the transfer management flags of pages A to F, as shown in FIG. 13.

Details of the program execution process (S104) are similar to those shown in FIG. 5. It is to be noted that the difference from Embodiment 1 is the software interrupt process (S203 in FIG. 5) executed in the program execution process (S104).

Figure 14:
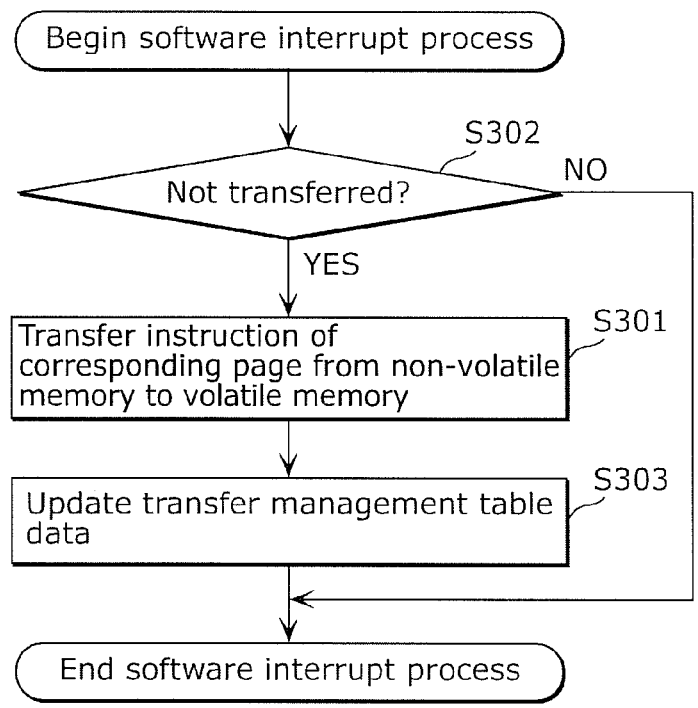
FIG. 14 is a detailed flowchart of a software interrupt process (S203 in FIG. 5).

FIG. 14 is a detailed flowchart of the software interrupt process (S203 in FIG. 5).

By referring to the transfer management table data 204 when the software interrupt is generated by the software interrupt instruction pi, the instruction transfer unit 113 determines whether or not the instruction is not transferred to the corresponding page (S302).

When the instructions are not transferred to the corresponding page (YES in S302), the instruction transfer unit 113 transfers the instruction to be stored in the corresponding page from the non-volatile memory 300 to the corresponding page of the volatile memory (S301). Subsequently, the instruction transfer unit 113 updates the transfer management table data 204 (S303). In other words, the transfer management flag of the corresponding page is changed from 0 to 1. For example, under a state of the instruction area 202 as shown in FIG. 7, the transfer management table data 204 is as shown in FIG. 15. Subsequently, when the software interrupt is generated by the software interrupt instruction pi of page D as shown in FIG. 9 and then the instructions are transferred to page D, the transfer management table data 204 is as shown in FIG. 16. In other words, the transfer management flag of page D is changed from 0 to 1.

When the instructions have already been transferred to the corresponding page (NO in S302), the instruction transfer unit 113 ends the interrupt process. The transfer of the instruction to the corresponding page shows a situation in which the software interrupt has been performed by the software interrupt instruction pi embedded in the program for designating a breakpoint in debugging. In this situation, since the instructions have already been transferred and the instruction does not have to be transferred, the instruction is prevented from being transferred.

As described above, the information device 20 according to Embodiment 2 is capable of determining whether or not the instructions are transferred, by referring to the transfer management table data 204. For example, there is a case where a software interrupt instruction pi is embedded in the program for a purpose different from that for generating an interrupt such as the purpose for designating a breakpoint in debugging. In this case, although it is not necessary to transfer the instructions by executing the software interrupt instruction pi in the breakpoint, the instructions have been transferred when there is no means for determining whether or not the instructions have been transferred. In this case, it can be appropriately determined whether or not the instruction is to be transferred, by referring to the transfer management table data 204.

Moreover, the information device 20, as similarly to the information device 10 according to Embodiment 1, is capable of performing instruction execution and instruction transfer simultaneously in parallel. Therefore, the program does not have to be segmented according to a program type, and it is possible to quicken the system from when the system makes the first start.

It is to be noted that when the instruction for generating a system call exception is used as an interrupt generation mode instead of the software interrupt instruction pi, an instruction for generating the system call exception appears in the program. Also in this case, by using the transfer management table, it is possible to be determined whether or not the instruction for generating the system call exception that is the execution target has been written into by the code write unit 101 for generating the system call exception.

It is to be noted that when the software interrupt instruction pi is used only for generating the interrupt, the transfer management table data 204 is unnecessary. Therefore, in such a case, the information device 10 as shown in Embodiment 1 may be used.

Embodiment 3

The following will describe an information device according to Embodiment 3 of the present disclosure.

Figure 17:
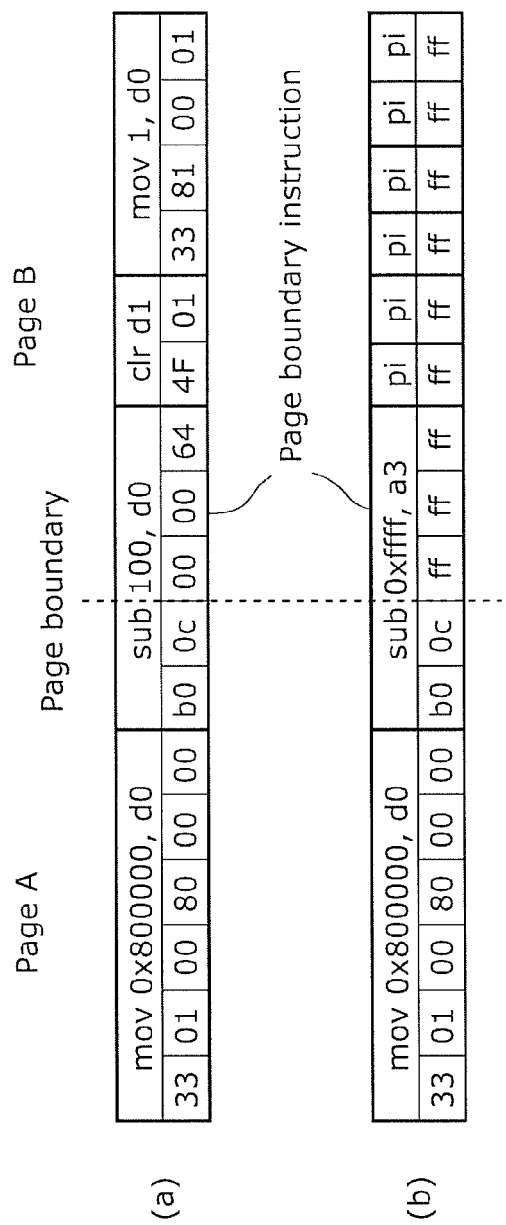
FIG. 17 is a diagram for explaining a page boundary instruction.

For example, as shown in (a) in FIG. 17, there is a case where in the instruction area of the volatile memory, the instruction is located across the page boundary between two pages (for example, page A and page B). Hereinafter, the instruction is referred to as the page boundary instruction. In the example of (a) in FIG. 17, the page boundary instruction is "sub 100, d0". At this time, as shown in (b) in FIG. 17, when the instruction is transferred to only one of the pages (for example, page A) and the instruction is not transferred to the other page (for example, page B), some values of the page boundary instruction are rewritten by the software interrupt instruction pi. Therefore, the page boundary instruction "sub 0xffff, a3" different from the original page boundary instruction is stored in the instruction area. This means that if the page boundary instruction is executed, an erroneous result is derived and a glitch occurs to the information device. Therefore, in Embodiment 3, a mechanism is included for preventing the execution of the page boundary instruction different from the original page boundary instruction. It is to be noted that the page boundary instruction is generated (i) in the case where the instruction is a variable length instruction and (ii) in the case where even if the instruction is a fixed length instruction, the head instruction is located in the non-aligned location and therefore the instruction is located across the boundary between the two pages. In other words, when the fixed length instruction is aligned and located in the instruction area, the problem does not occur. Therefore, in such a case, the information device 10 as described in Embodiment 1 or 2 may be used.

Figure 18:
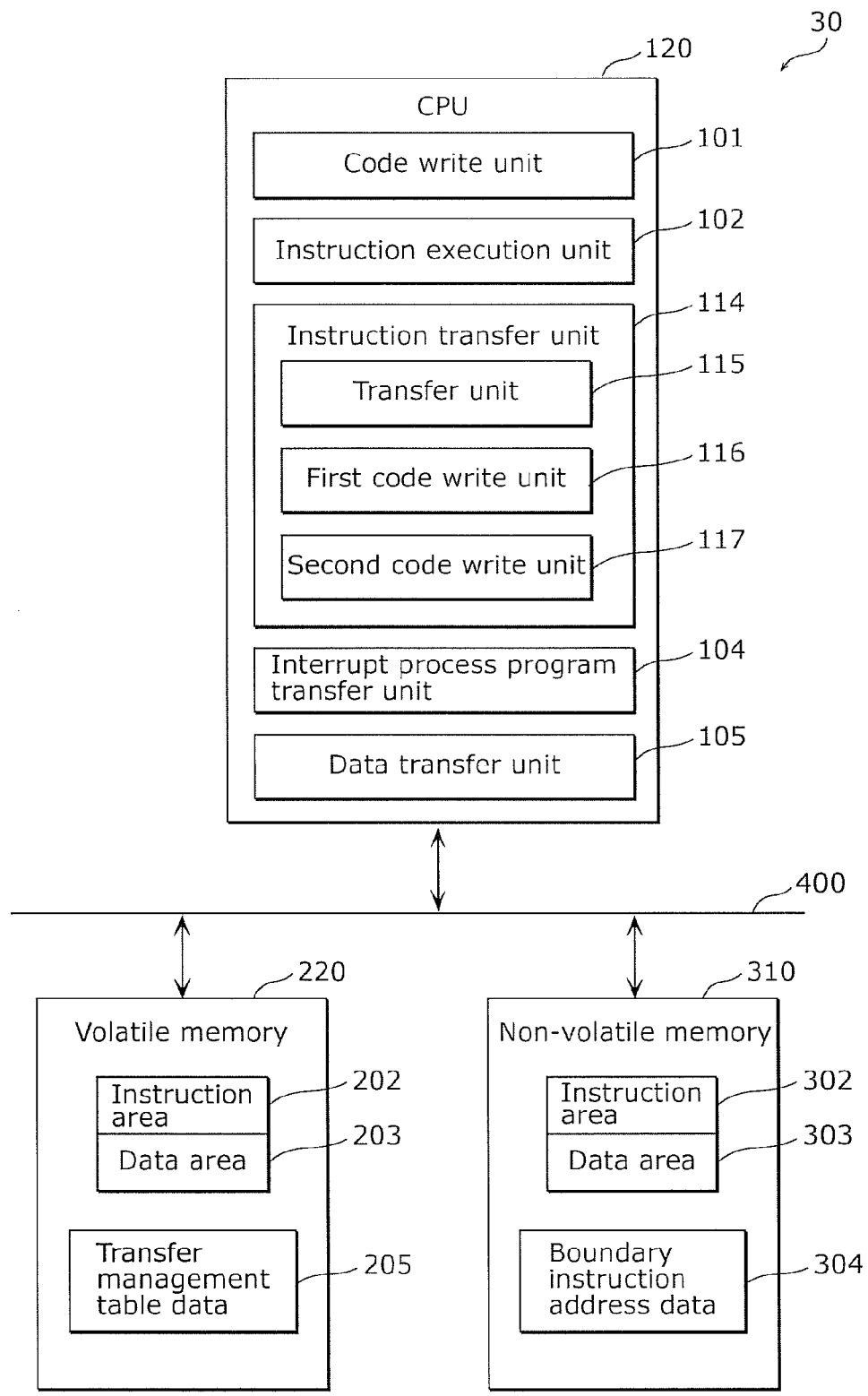
FIG. 18 is a block diagram showing a functional configuration of an information device according to Embodiment 3 of the present disclosure.

FIG. 18 is a block diagram showing a functional configuration of an information device according to Embodiment 3 of the present disclosure. In the following description, the same reference numerals are assigned to the same structural elements as those in the above described embodiments. Since the functions and names are the same as those in the above described embodiments, a description thereof will be omitted where appropriate.

An information device 30 is an apparatus which executes a program, and the information device 30 includes a CPU 120, a volatile memory 220, and a non-volatile memory 310. The CPU 120, the volatile memory 220, and the non-volatile memory 310 are connected to each other via a bus 400.

The CPU 120 is a processing unit which executes the program, and plays a role as a start control apparatus which controls the start of the information device 30. The volatile memory 220 is a volatile memory which stores the program executed by the CPU 120. The volatile memory 220 includes a dynamic random access memory (DRAM). The non-volatile memory 310 is a non-volatile memory which stores a program transferred to the volatile memory 220 and executed by the CPU 120. The non-volatile memory 310 includes a NAND flash memory or a NOR flash memory. The volatile memory 220 is accessible faster than the non-volatile memory 310.

The volatile memory 220 includes the instruction area 202 and the data area 203. The volatile memory 220 also stores a transfer management table data 205. The transfer management table data 205 is a data showing (i) pages in which the instructions have already been transferred from the non-volatile memory 310 to the volatile memory 220 and which are included in the instruction area 202 and (ii) the address on the volatile memory 220 of the page boundary instruction. FIG. 19 is a diagram showing an example of the transfer management table data 205. The transfer management table data 205 stores, for each of the pages, a transfer management flag, a boundary instruction presence or absence flag, a boundary instruction address, and a head code. The transfer management flag is similar to that in Embodiment 2, and therefore a description thereof will be omitted. The boundary instruction presence or absence flag shows, with 1, that the boundary instruction exists across the corresponding page and the next page, and with 0, that no boundary instruction exists. The boundary instruction address shows the start address of the page boundary instruction. The head code shows the first byte of the page boundary instruction. Although the page size according to the present embodiment is described as 256 bytes, any page size can be implemented according to the same method.

The non-volatile memory 310 includes the instruction area 302 and the data area 303. The non-volatile memory 310 stores boundary instruction address data 304. The boundary instruction address data 304 shows an address on the volatile memory 220 of the page boundary instruction. For example, as shown in FIG. 20, the boundary instruction address data 304 stores, on a page-by-page basis, a boundary instruction presence or absence flag and a boundary instruction address. The boundary instruction presence or absence flag and the boundary instruction address are similar to those described in FIG. 19. It is to be noted that in the present embodiment, the interrupt generation code is not included in the instruction stored in the instruction area 302. It is to be noted that the boundary instruction address data 304 is prepared in advance. For example, a compiler may prepare the boundary instruction address data when the program is compiled corresponding to the instruction stored in the instruction area 302. It is to be noted that the boundary instruction address data 304 may be dynamically generated instead of transferring the boundary instruction address data 304 to the transfer management table data 205. In this case, by decoding the instruction included in a range from (i) the address of the page boundary before a predetermined number of bytes from the address of the page boundary to (ii) the address of the page boundary, and it may be determined whether or not the page boundary instruction is included. At this time, the predetermined number of bytes may be a maximum number of bytes per instruction.

The CPU 120 includes the code write unit 101, the instruction execution unit 102, an instruction transfer unit 114, the interrupt process program transfer unit 104, and the data transfer unit 105.

The instruction transfer unit 114 (i) transfers the instructions to be stored in the corresponding page from the non-volatile memory 310 to the corresponding page of the volatile memory 220 when the software interrupt is generated by the interrupt generation mode (software interrupt instruction pi) in which the instructions are located on a non-transferred page, and writes the software interrupt instruction pi into the program boundary instruction located between the corresponding page and the adjacent page when the instruction is not transferred to the page located immediately after the corresponding page, and (ii) transfers the instructions to be stored immediately after the program boundary instruction from the non-volatile memory 310 to the page immediately after the program boundary instruction of the volatile memory 220 when the software interrupt is generated by the software interrupt instruction pi written into the program boundary instruction.

The instruction transfer unit 114 includes a transfer unit 115, a first code write unit 116, and a second code write unit 117.

The transfer unit 115 (i) determines the corresponding page as the page to be transferred when it is able to be determined that the instructions are not transferred to the corresponding page by referring to the transfer management table data 205 when the software interrupt is generated by the software interrupt instruction pi, and (ii) determines the page located immediately after the corresponding page as the page to be transferred when it is able to be determined that the instructions have already been transferred to the corresponding page by referring to the transfer management table data 205 when the software interrupt is generated by the software interrupt instruction pi, and (iii) transfers the instructions to be stored in the corresponding page determined as the page to be transferred or the page located immediately after the corresponding page from the non-volatile memory 310 to the page to be transferred of the volatile memory 220, and then updates the transfer management table data 205.

The first code write unit 116 writes the software interrupt instruction pi into the address of the page boundary instruction of the page to be transferred when it is able to be determined that the address of the page boundary instruction is included in the address of the page to be transferred and instructions are not transferred to the following page which is a page located immediately after the page to be transferred, by referring to the transfer management table data 205 after the process by the transfer unit 115.

The second code write unit 117 writes the page boundary instruction into the address of the page boundary instruction on the previous page when it is able to be determined that the address of the page boundary instruction is included in the address of the previous page that is a page located immediately before the page to be transferred and the instructions have already been transferred to the previous page, by referring to the transfer management table data 205 after the process by the transfer unit 115.

It is to be noted that the data transfer unit 105 further transfers the boundary instruction address data 304 stored in the non-volatile memory 310 to the transfer management table data 205 of the volatile memory 220.

The following will describe the process performed at the start by the information device 30 with reference to specific examples. In the following description, the numerals similar to those in the above embodiments are assigned to the steps similar to those in the above embodiments. A description will be omitted thereof where appropriate.

Figure 21:
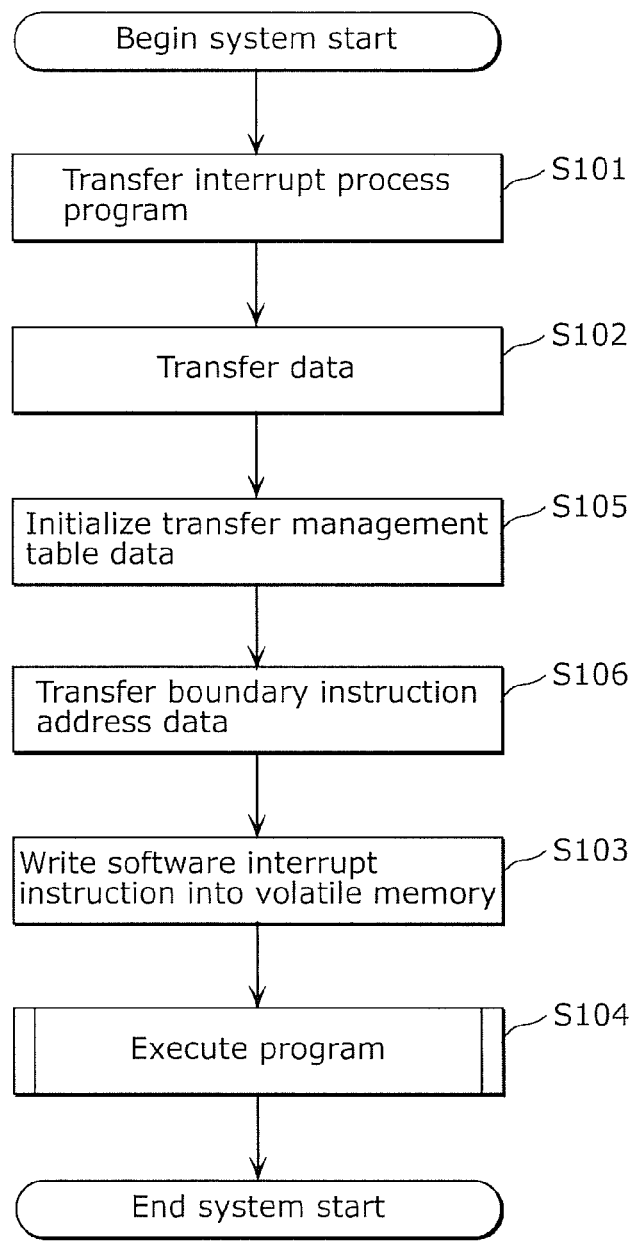
FIG. 21 is a flowchart of a process performed when the information device starts.

FIG. 21 is a flowchart of a process performed when the information device 30 starts.

The flow of the processes is similar to that at the start of the information device 20 shown in FIG. 12. It is to be noted that until the program execution process (S104) starts, the data transfer unit 105 transfers the boundary instruction address data 304 stored in the non-volatile memory 310 to the transfer management table data 205 of the volatile memory 220. For example, the transfer management table data 205 shown in FIG. 19 can be obtained by transferring the boundary instruction address data 304 shown in FIG. 20 to the transfer management table data 205.

Details of the program execution process (S104) are similar to those shown in FIG. 5. It is to be noted that the software interrupt process (S203 in FIG. 5) executed in the program execution process (S104) is different from that in Embodiment 1.

Figure 22:
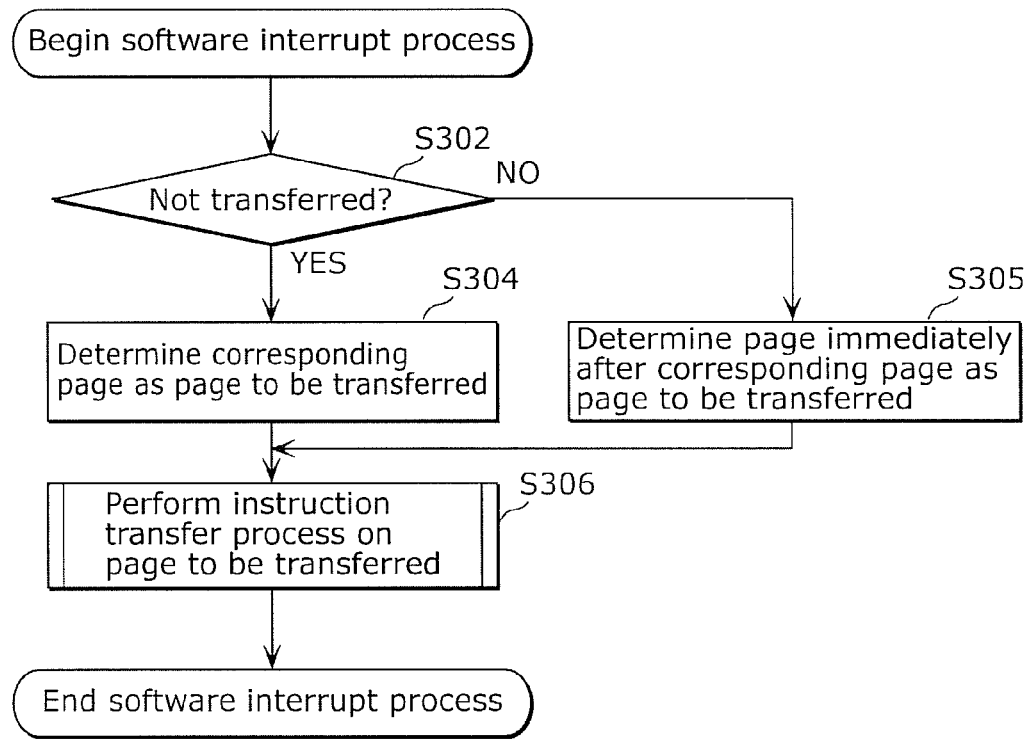
FIG. 22 is a detailed flowchart of the software interrupt process (S203 in FIG. 5).

FIG. 22 is a detailed flowchart of the software interrupt process (S203 in FIG. 5).

By referring to the transfer management table data 205 when the software interrupt is generated by the software interrupt instruction pi, the transfer unit 115 determines whether or not the instructions are not transferred to the corresponding page (S302).

Figure 23:
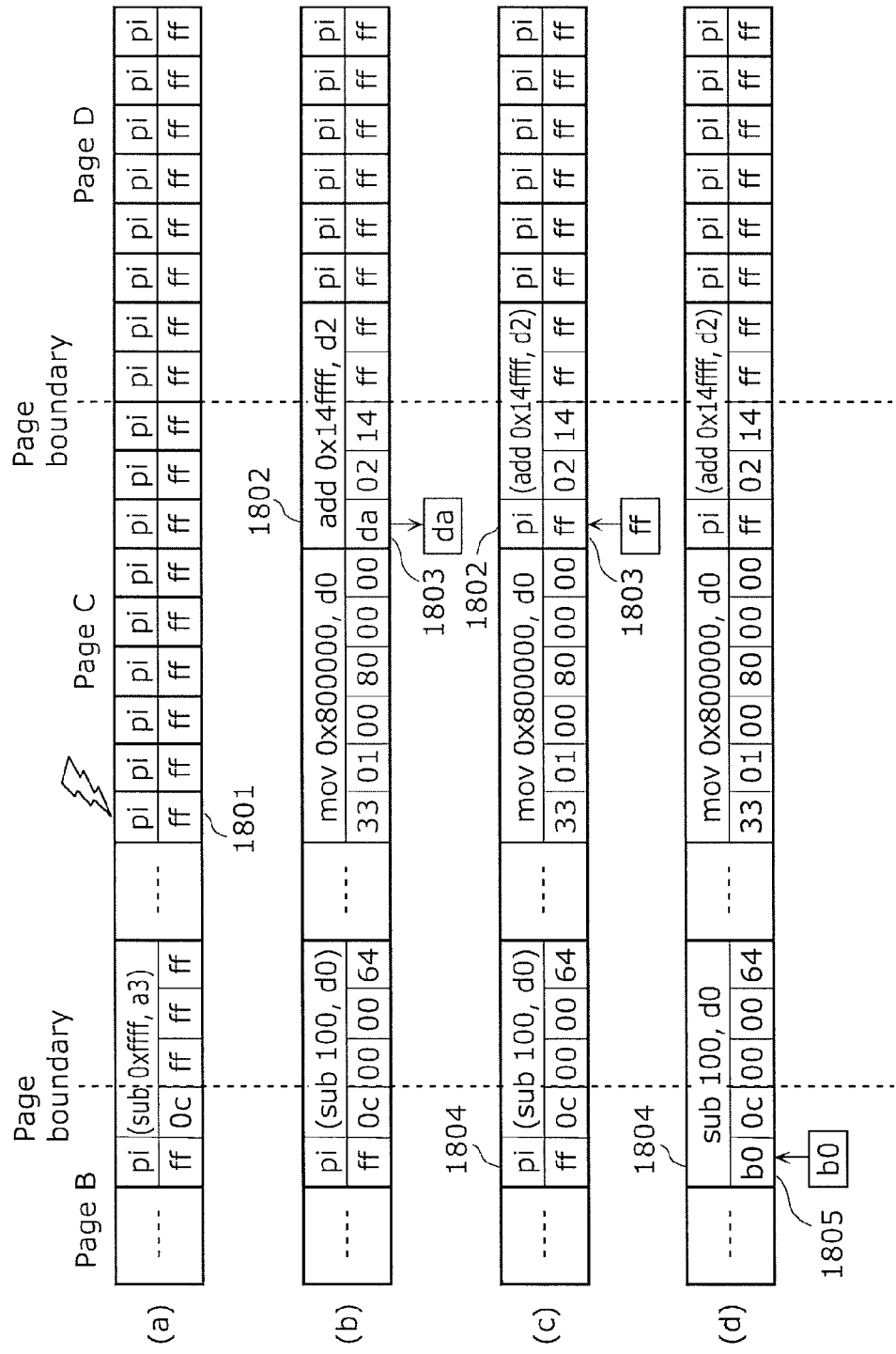
FIG. 23 is a diagram for explaining a process performed when the software interrupt instruction is executed.

When the instructions are not transferred to the corresponding page (YES in S302), the transfer unit 115 determines that the corresponding page is the page to be transferred (S304). For example, as shown in (a) in FIG. 23, when the software interrupt is generated by the execution of a software interrupt instruction 1801 on page C (software interrupt instruction pi), page C that is the corresponding page is determined as the page to which the instructions are to be transferred.

Figure 24:
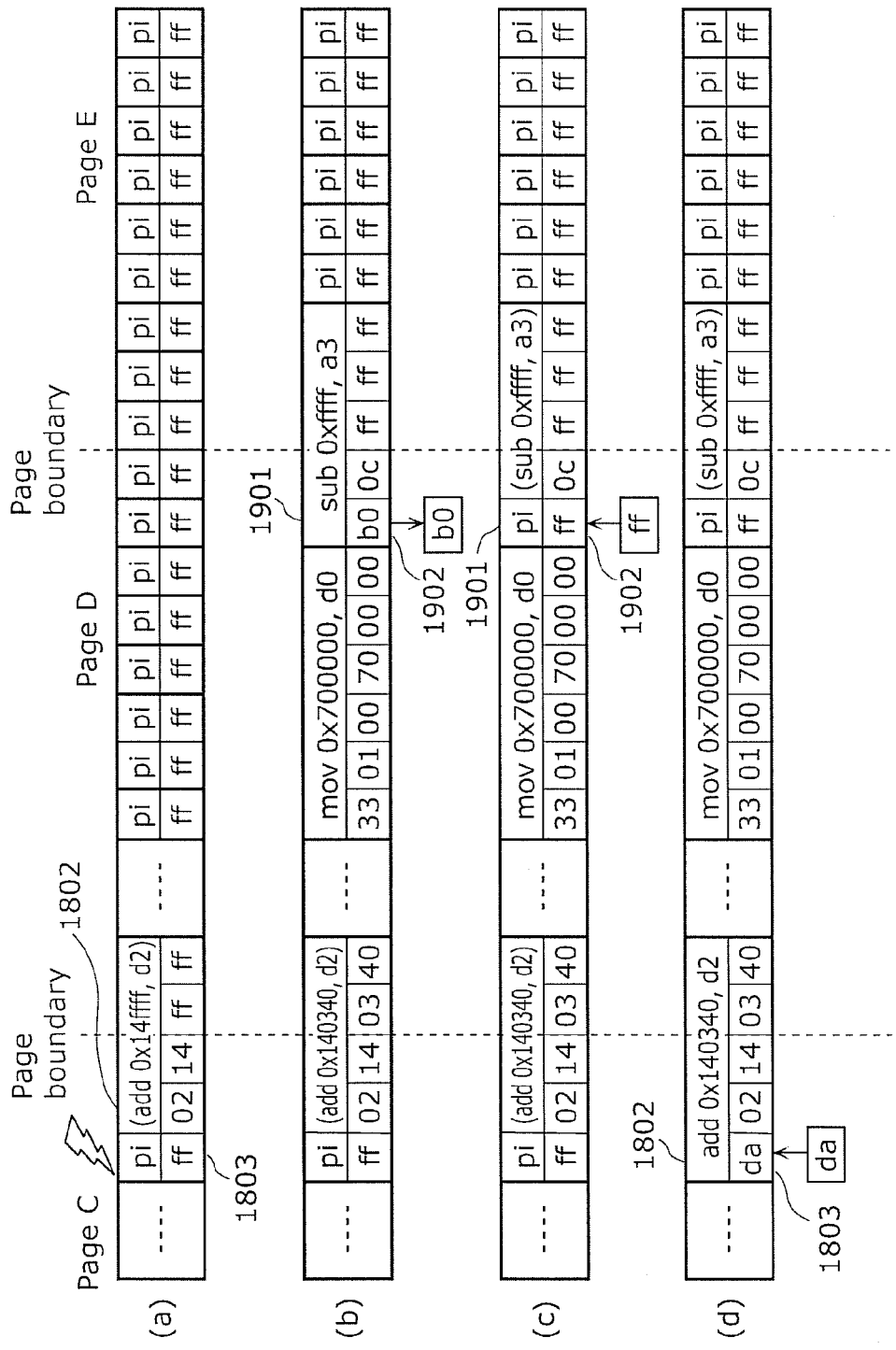
FIG. 24 is a diagram for explaining a process performed when the software interrupt instruction is executed.

When the instructions have already been transferred to the corresponding page (NO in S302), it is determined that the page located immediately after the corresponding page is the page to be transferred (S305). For example, as shown in (a) in FIG. 24, when the software interrupt is generated by the execution of the software interrupt instruction pi located in a start address 1803 of the page boundary instruction 1802 on page C and the instruction has already been transferred to page C, as described later, the software interrupt instruction pi located in the start address of page C is obtained by rewriting the page boundary instruction into the software interrupt instruction pi. Therefore, page D located immediately after page C is determined as the page to which the instruction is to be transferred. The reason why the page to be transferred in this way is determined will be described later.

The transfer unit 115, the first code write unit 116, and the second write unit 117 transfer the instructions to be stored in the corresponding page determined as the page to be transferred or the page located immediately after the corresponding page from the non-volatile memory 310 to the page to be transferred of the volatile memory 220, and then update the transfer management table data 205 (S306).

Figure 25:
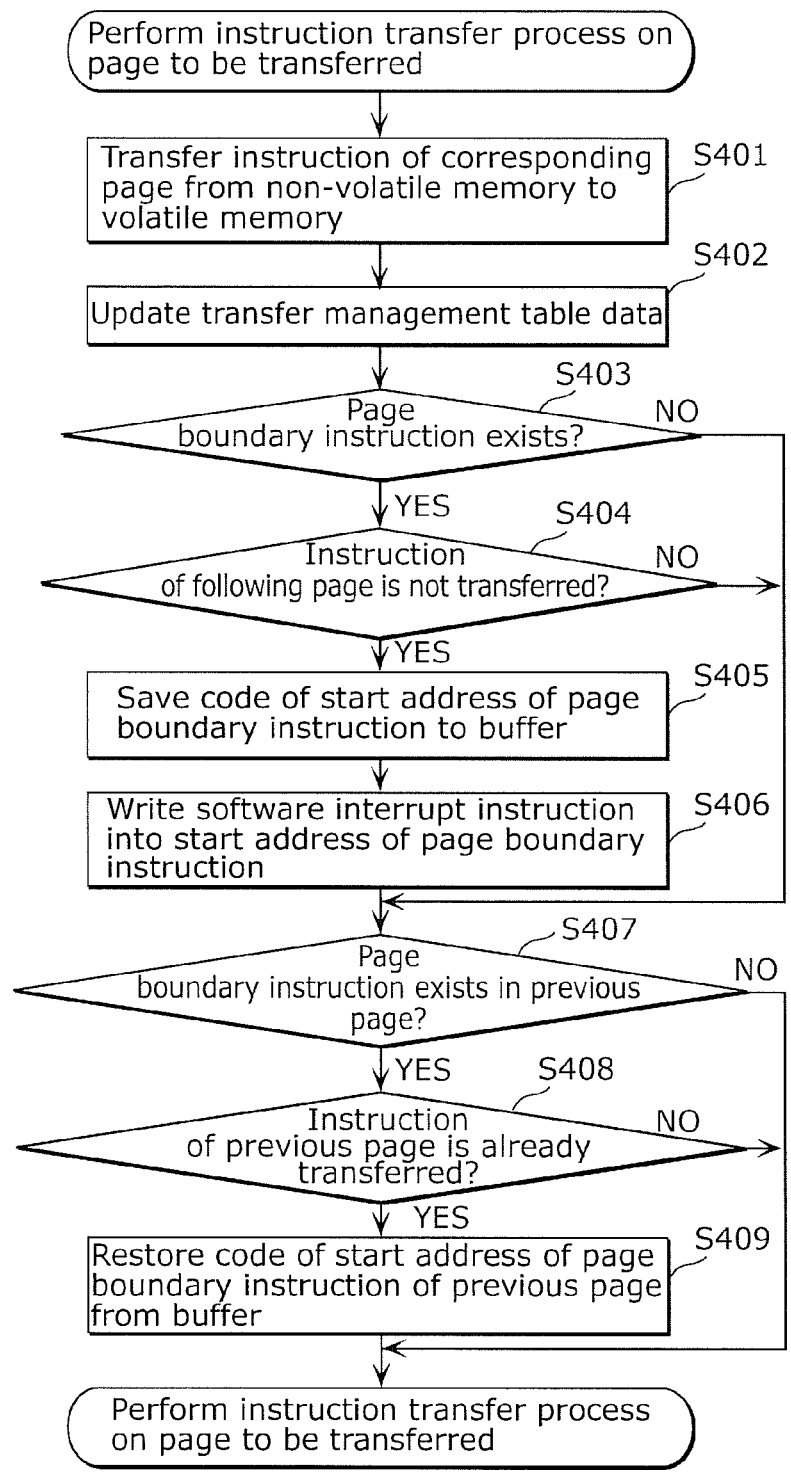
FIG. 25 is a detailed flowchart of the instruction transfer process (S306 in FIG. 22).

Details of the instruction transfer process (S306 in FIG. 22) will be described next. FIG. 25 is a detailed flowchart of the instruction transfer process (S306 in FIG. 22).

The transfer unit 115 transfers the instructions to be stored in the corresponding page determined as the page to be transferred or the page located immediately after the corresponding page (S401) from the non-volatile memory to the page, of the volatile memory, to be transferred, and then updates the transfer management table data 205 (S402). In the case of the example showing in (a) in FIG. 23, since the page to be transferred is page C, the instruction is transferred to page C and the state is as shown in (b) in FIG. 23. Subsequently, the transfer management flag on page C of the transfer management table data 205 is written from 0 to 1, and the state is like that shown in FIG. 26.

The first code write unit 116 determines whether or not the address of the page boundary instruction is included in the address of the page to be transferred, by referring to the transfer management table data 205 (S403). In other words, when the boundary instruction presence or absence flag is 1 in the transfer management table data 205, it is determined that the address of the page boundary instruction is included in the address of the page to be transferred. When the boundary instruction presence or absence flag is 0 in the transfer management table data 205, it is determined that the address of the page boundary instruction is not included in the address of the page to be transferred. When the address of the page boundary instruction is included in the address of the page to be transferred (YES in S403), the first code write unit 116 determines whether or not the instruction is not transferred to the following page that is the page located immediately after the page to be transferred, by referring to the transfer management table data 205 (S404). In other words, it is determined that when the transfer management flag on the following page is 0 in the transfer management table data 205, the instructions are not transferred to the following page, and it is determined that when the transfer management flag on the following page is 1 in the transfer management table data 205, the instruction has already been transferred to the following page. In the example showing in (b) in FIG. 23, the address of the page boundary instruction 1802 is included in the address on page C that is the page to be transferred, and the instructions are not transferred to page D that is the following page. Since this situation shows that the page boundary instruction 1802 is different from the original code, a measure is taken such that the page boundary instruction 1802 is not executed in the following process.

When the instructions are not transferred to the following page (YES in S404), the first code write unit 116 saves, to a buffer, the code of the start address of the page boundary instruction included in the page to be transferred (S405). Subsequently, the first code write unit 116 writes the software interrupt instruction pi into the address of the page boundary instruction on the page to be transferred (S406). In the example shown in (b) in FIG. 23, a code "da" of the start address 1803 of the page boundary instruction 1802 is saved to the buffer, and the software interrupt instruction pi is written into the start address 1803 as shown in (c) in FIG. 23. With this, even when the program counter shows the start address 1803, it is possible to prevent the execution of the page boundary execution different from the original instruction. It is to be noted that in the present embodiment, a column of the head code in the transfer management table data 205 is used as the buffer. With this, in the state shown in (c) in FIG. 23, the state of the transfer management table data 205 is as shown in FIG. 27. In other words, the code "da" of the start address 1803 is written into the column of the head code on page C.

It is to be noted that when the address of the page boundary instruction is not included in the address of the page to be transferred (NO in S403), the processes from S404 to S406 are not performed. Moreover, when the address of the page boundary instruction is included in the page to be transferred and the instructions have already been transferred to the following page (YES in S403, No in S404), the page boundary instruction is an original instruction and the execution of the page boundary instruction does not cause a problem such as a glitch, with the result that the processes of S405 and S406 are not performed.

Next, the second code write unit 117 determines whether or not the address of the page boundary instruction is included in the address of the previous page that is a page located immediately before the page to be transferred, by referring to the transfer management table data 205 (S407). In other words, it is determined that when the boundary instruction presence or absence flag of the previous page is 1 in the transfer management table data 205, the address of the page boundary instruction is included in the address of the previous page and it is determined that when the boundary instruction presence or absence flag of the previous page is 0, the address of the page boundary instruction is not included in the address of the previous page. When the address of the page boundary instruction is included in the address of the previous page (YES in S407), the second code write unit 117 determines whether or not the instructions have already been transferred to the previous page, by referring to the transfer management table data 205 (S408). In other words, it is determined that when the transfer management flag of the previous page is 1 in the transfer management table data 205, the instructions have already been transferred to the previous page and it is determined that when the transfer management flag of the previous page is 0 in the transfer management table data 205, the instructions are not transferred to the previous page. In the example shown in (c) in FIG. 23, the address of the page boundary instruction 1804 is included in the address of the page B that is the previous page, and the instructions have already been transferred to page B. In this situation, since the processes of S405 and S406 were performed on the page boundary instruction 1804 in the past, the software interrupt instruction pi is written into the start address of the page boundary instruction 1804. Moreover, the instructions have already been transferred to page B and page C. Therefore, by writing back the software interrupt instruction pi of the page boundary instruction 1804 to the original code, it is possible to make the page boundary instruction 1804 executable.

When the instruction has already been transferred to the previous page (YES in S408), the second code write unit 117 writes the page boundary instruction saved to the buffer into the address of the page boundary instruction of the previous page. In the example shown in (c) in FIG. 23, since the instructions have already been transferred to page B that is the previous page, the head code "b0" of page B described in the transfer management table data 205 shown in FIG. 27 is written into the start address 1805 of the page boundary instruction 1804.

It is to be noted that when the address of the page boundary instruction is not included in the address of the previous page (NO in S407), the processes of S408 and S409 are not performed. Moreover, when the address of the page boundary instruction is included in the address of the previous page and the instructions are not transferred to the previous page (YES in S407, YES in S408), there is no code to be written into the start address of the page boundary instruction in the previous page, with the result that the process of S409 is not performed.

Next, a specific example of the case where the page located immediately after the corresponding page is determined as the page to be transferred in S305 will be described. For example, as shown in (a) in FIG. 24, it is assumed that the software interrupt is generated by the execution of the software interrupt instruction pi written into the start address 1803 of the page boundary instruction 1802 of page C, and page D located immediately after page C is determined as the page to be transferred (NO in S301 in FIG. 22, S305). At this time, as shown in (b) in FIG. 24, the instructions are transferred to page D (S401 in FIG. 25). Moreover, since the instructions are not transferred to page E that is the following page of page D, a code "b0" of the start address 1902 of the page boundary instruction 1901 of page D is saved to the buffer (S405 in FIG. 25). At this time, the state of the transfer management table data 205 is as shown in FIG. 28. Subsequently, as shown in (c) in FIG. 24, the software interrupt instruction pi is written into the start address 1902 of the page boundary instruction 1901 (S406 in FIG. 25). Moreover, since the address of the page boundary instruction 1802 is included in the address of the previous page of page D and the instruction has already been transferred to page C (YES in S407 in FIG. 25, YES in S408), as shown in (d) in FIG. 24, a head code "da" of page C described in the transfer management table data 205 shown in FIG. 28 is written into the start address 1803 of the page boundary instruction 1802 of page C. With this, the original page boundary instruction 1802 is changed into an executable state.

As described above, when the instructions have been transferred to the page to be transferred and the instruction is not transferred to the adjacent page, the information device 30 according to Embodiment 3 stores the software interrupt instruction pi in the address of the page boundary instruction located across the boundary between the page to be transferred and the adjacent page. With this, it is possible to prevent the execution of the page boundary instruction different from the original page boundary instruction.

Embodiment 4

The following will describe an information device according to Embodiment 4 of the present disclosure.

The information device 20 according to Embodiment 2, by referring to the transfer management table data 204, transfers the instruction from the non-volatile memory 300 to the page of the volatile memory 210 to which the instructions are not transferred. However, the transfer of the instruction is limited to when the interrupt is generated by the execution of the software interrupt instruction pi. The difference of Embodiment 4 from Embodiment 2 is that the transfer of the instruction is performed not only when the interrupt is generated by the software interrupt instruction pi but also when the instruction execution unit 102 is in an idle state. Here, the case of where the instruction execution unit 102 is in an idle state includes an input waiting state.

The functional configuration of the information device according to Embodiment 4 is similar to the functional configuration of the information device 20 according to Embodiment 2 shown in FIG. 10. It is to be noted that the process performed by the instruction transfer unit 113 is different from the process performed by the instruction transfer unit 113 according to Embodiment 2. In other words, the instruction transfer unit 113 performs the transfer of the instructions when the software interrupt is generated by the software interrupt instruction pi as shown in Embodiment 2, and also transfers the instruction to be stored in the page to which the instructions are not transferred from the non-volatile memory 300 to the page of the volatile memory 210 to which the instructions are not transferred, when the instruction execution unit 102 is in an idle state.

The following will describe the process performed at the start by the information device 20 with reference to specific examples.

The information device 20 performs a similar process to that shown in Embodiment 2. In addition, when the instruction execution unit 102 is in an idle state, the following processes are performed.

Figure 29:
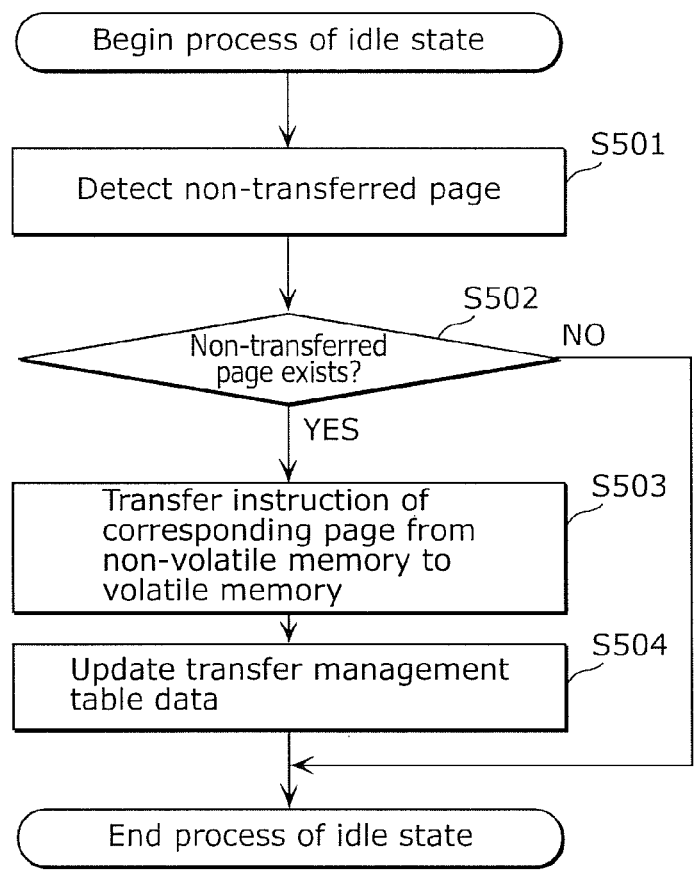
FIG. 29 is a flowchart showing a process performed when the instruction execution unit is in an idle state.

FIG. 29 is a flowchart showing the processes performed when the instruction execution unit 102 is in an idle state.

When the instruction execution unit 102 is in an idle state, the instruction transfer unit 113 detects the page to which the instructions are not transferred by referring to the transfer management table data 204 (S501). In other words, the instruction transfer unit 113 detects the page in which the transfer management flag is 0 in the transfer management table data 204. For example, as shown in FIG. 30, when the instructions are not transferred to pages B, C, E, and F in the instruction area 202, the state of the transfer management table data 204 is as shown in FIG. 31. Therefore, the instruction transfer unit 113 detects one of the pages in which the transfer management flag is 0 in the transfer management table data 204. A page may be detected in descending order starting from the top, and a page may be detected at random. For example, it is assumed that page B has been detected.

When the page to which the instructions are not transferred is detected (YES in S502), the instruction transfer unit 113 transfers the instructions to be stored in the corresponding page that is the page to which the instructions are not transferred from the non-volatile memory 300 to the corresponding page of the volatile memory 210 (S503), and then updates the transfer management table data 204 (S504). For example, the instruction is transferred to page B as shown in FIG. 32, and the transfer management table data 204 is updated as shown in FIG. 33. In other words, the transfer management flag of page B is changed from 0 to 1.

When the page to which the instructions are not transferred is not detected (NO in S502), the instruction transfer unit 113 ends the process.

The instruction transfer unit 113 repeats the processes of S501 to S504 when the instruction execution unit 102 is in an idle state. For example, after (i) page C is determined as the corresponding page by referring to the transfer management table data 204 in FIG. 33 and (ii) the instruction is transferred to page C as shown in FIG. 34, the transfer management table data 204 is updated as shown in FIG. 35. In other words, the transfer management flag of page C is changed from 0 to 1.

As described above, in the information device 20 according to Embodiment 4, the total number of software interrupts can be reduced by causing the instruction transfer unit 113 to transfer the instruction in advance when the instruction execution unit 102 is in an idle state. Therefore, the system start can be quickened.

It is to be noted that another interrupt is prohibited when the interrupt process performed by the interrupt process program transfer unit 104 is performed when the instruction execution unit 102 is in an idle state. With this, it is possible to prohibit the execution of the software interrupt instruction pi of the corresponding page by the cancellation of being in an idle state when the transfer of the instruction in an idle state is performed.

Embodiment 5

The following will describe an information device according to Embodiment 5 of the present disclosure.

When the instruction execution unit 102 is in an idle state, the information device 20 according to Embodiment 4 transfers the instructions from the non-volatile memory 300 to the page of the volatile memory 210 to which the instructions are not transferred. At this time, the page to be transferred is detected in descending order starting from the top or is detected in random. The difference of the present embodiment from Embodiment 4 is that the page to be a transfer target is detected according to a transfer sequence of instructions on a page-by-page basis when the information device makes the first start.

Figure 36:
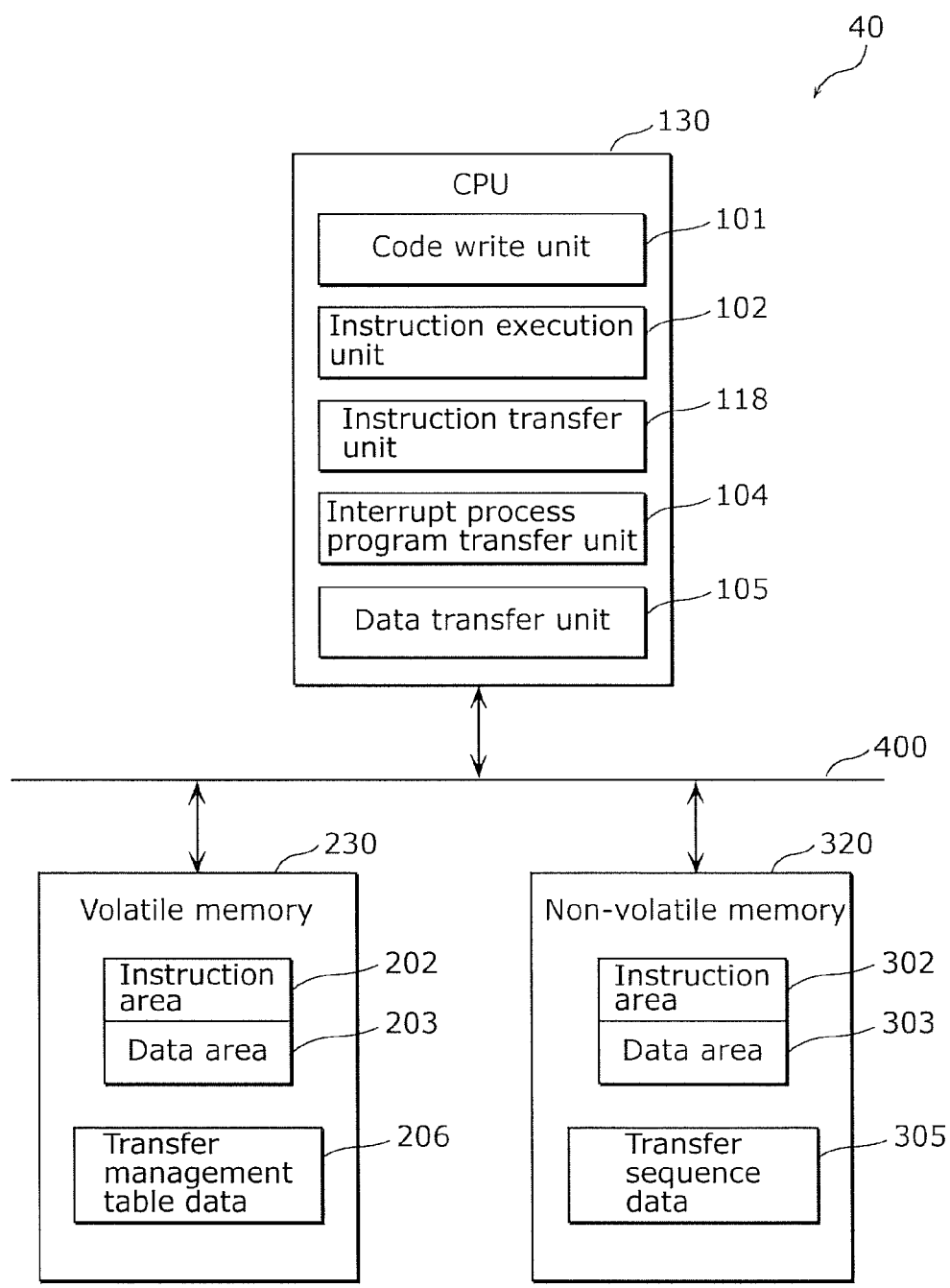
FIG. 36 is a block diagram showing a functional configuration of an information device according to Embodiment 5 of the present disclosure.

FIG. 36 is a block diagram showing a functional configuration of an information device according to Embodiment 5 of the present disclosure. In the following description, the same reference numerals are assigned to the same structural elements as those in the above described embodiments. Since the functions and names are the same as those in the above described embodiments, a description thereof will be omitted where appropriate.

An information device 40 is an apparatus which executes a program, and the information device 40 includes a CPU 130, a volatile memory 230, and a non-volatile memory 320. The CPU 130, the volatile memory 230, and the non-volatile memory 320 are connected to each other via the bus 400.

The CPU 130 is a processing unit which executes the program, and plays a role as a start control apparatus which controls the start of the information device 40. The volatile memory 230 is a volatile memory which stores the program performed by the CPU 130. The volatile memory 230 includes a dynamic random access memory (DRAM). The non-volatile memory 320 is a non-volatile memory which stores a program transferred to the volatile memory 230 and executed by the CPU 130. The non-volatile memory 320 includes a NAND flash memory or a NOR flash memory. The volatile memory 230 is accessible faster than the non-volatile memory 320.

Figure 37:
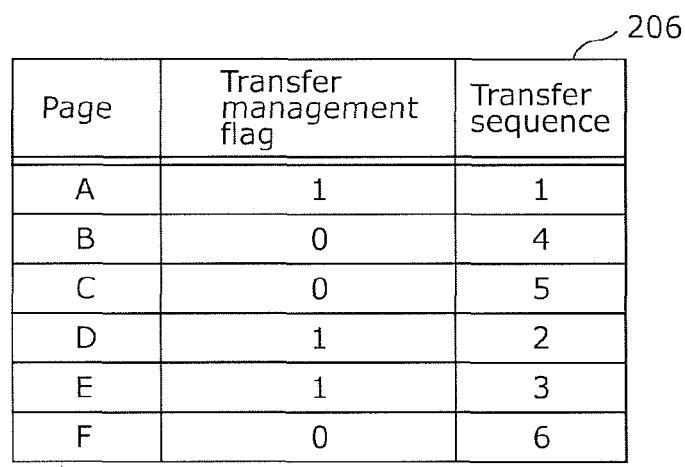
FIG. 37 is a diagram showing an example of the transfer management table data.

The volatile memory 230 includes the instruction area 202 and the data area 203. The volatile memory 230 stores transfer management table data 206. The transfer management table data 206 is data showing (i) pages in which the instructions have already been transferred from the non-volatile memory 320 to the volatile memory 230 and which are included in the instruction area 202 and (ii) a transfer sequence of instructions on a page-by-page basis from the non-volatile memory 320 to the volatile memory 230. FIG. 37 is a diagram showing an example of the transfer management table data 206. The transfer management table data 206 stores, on a page-by-page basis, a transfer management flag and a transfer sequence. The transfer management flag is similar to that in Embodiment 2, and therefore a description thereof will be omitted. The transfer sequence shows a transfer sequence of the instruction on a page-by-page basis from the non-volatile memory 320 to the volatile memory 230 when the information device 40 makes the first start. For example, as shown in FIG. 38, when the instructions have been transferred in a sequence of pages A, D, E, B, C, and F, the transfer sequence of the transfer management table data 206 is as shown in FIG. 37.

Figure 39:
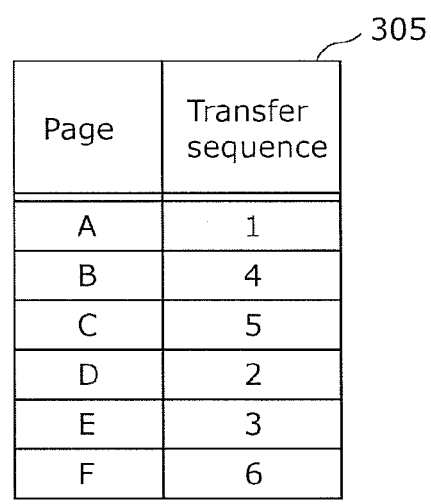
FIG. 39 is a diagram showing an example of the transfer sequence data.

The non-volatile memory 320 includes the instruction area 302 and the data area 303. The non-volatile memory 320 stores transfer sequence data 305. The transfer sequence data 305 shows a transfer sequence of the instructions on a page-by-page basis from the non-volatile memory 320 to the volatile memory 230 when the information device 40 makes the first start. For example, as shown in FIG. 39, the transfer sequence data 305 stores a transfer sequence for each of the pages. The transfer sequence data 305 in FIG. 39 shows that the instructions have been transferred in the sequence of pages A, D, E, B, C, and F.

The CPU 130 includes the code write unit 101, the instruction execution unit 102, an instruction transfer unit 118, the interrupt process program transfer unit 104, and the data transfer unit 105.

The instruction transfer unit 118, by referring to the transfer management table data 206, when the instruction execution unit 102 is in an idle state, transfers the instruction to be stored in a page to which the instructions are not transferred from the non-volatile memory 320 to the page of the volatile memory 230 to which the instructions are not transferred according to the transfer sequence indicated by the transfer management table data 206, and then updates the transfer management table data 206.

It is to be noted that the data transfer unit 105 further transfers transfer sequence data 305 stored in the non-volatile memory 320 to the transfer management table data 206 of the volatile memory 230.

The following will describe the process performed at the start by the information device 40 with reference to specific examples. In the following description, the numerals similar to those in the above embodiments are assigned to the steps similar to those in the above embodiments. A description thereof will be omitted where appropriate.

Figure 40:
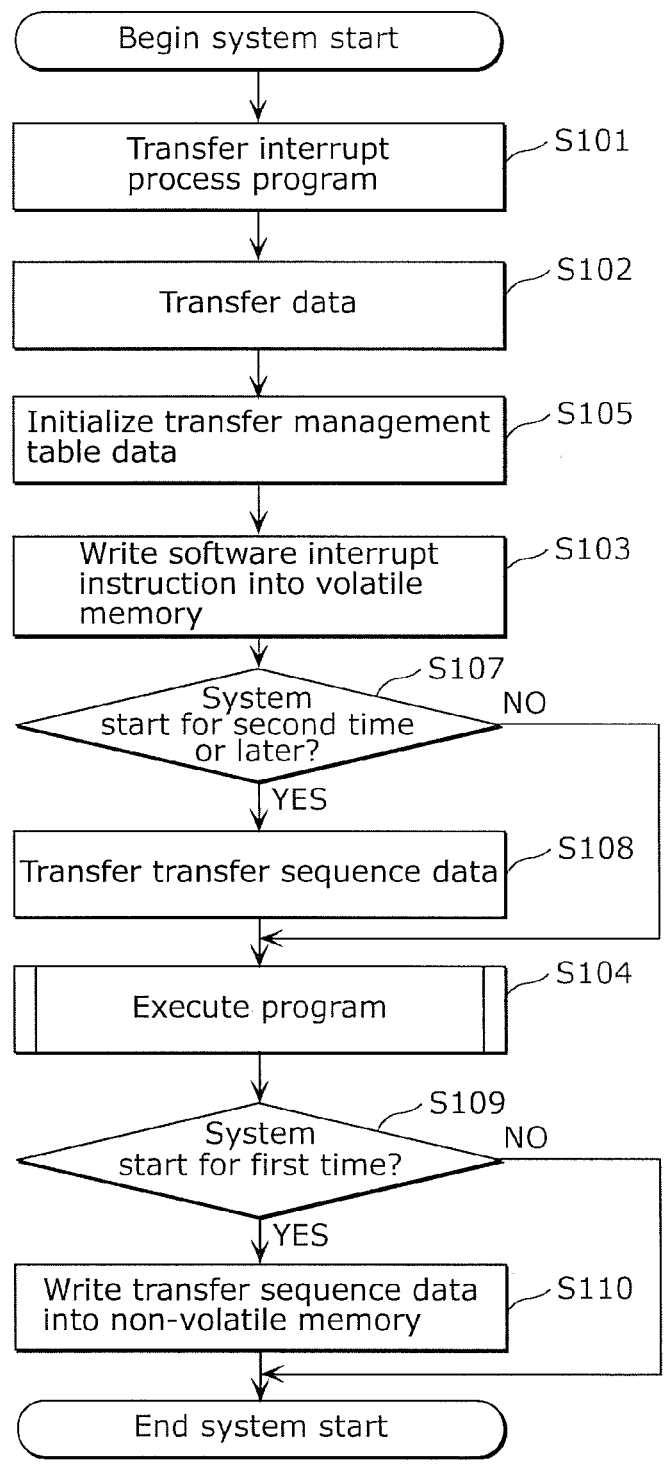
FIG. 40 is a flowchart of a process performed when the information device starts.

FIG. 40 is a flowchart of a process performed when the information device 40 starts.

Figure 41:
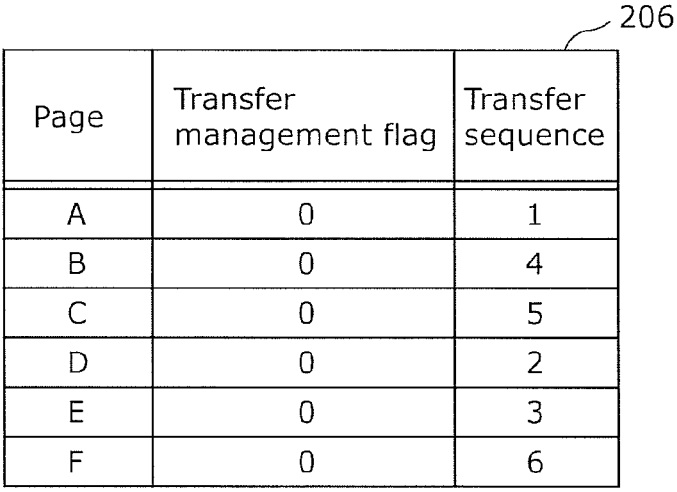
FIG. 41 is a diagram showing an example of the transfer management table data.

The flow of S101, S102, S105, and S103 is similar to the flow of processes performed the information device 20 at the time of the start shown in FIG. 12. After the software interrupt instruction write process (S103), the data transfer unit 105 determines whether or not the information device 40 makes the second or subsequent start (S107). When it is determined that the second or subsequent start is made, the transfer sequence data 305 is transferred to the transfer management table data 206 (S108). In other words, the transfer sequence data 305 stored in the non-volatile memory 320 is transferred to the transfer management table data 206 of the volatile memory 230. For example, by transferring the transfer sequence data 305 shown in FIG. 39 to the transfer management table data 206, the transfer management table data 206 shown in FIG. 41 can be obtained. The determination on whether the second or subsequent start is made may be performed by holding the total number of starts in the non-volatile memory 320 and by referring to the total number of starts by the data transfer unit 105. Moreover, by not storing the transfer sequence data 305 in the non-volatile memory 320 at the time of the first start, it may be determined that the first start is identified when the transfer sequence data 305 is not stored in the non-volatile memory 320, and it may be determined that the second or subsequent start is identified when the transfer sequence data 305 is stored in the non-volatile memory 320.

Subsequently, the program execution process is performed (S104). Details of the program execution process (S104) are similar to those shown in FIG. 5. It is to be noted that the software interrupt process (S203 in FIG. 5) executed in the program execution process (S104) is different from that in Embodiment 1.

After the program execution process (S104), the data transfer unit 105 determines whether or not the information device 40 makes the first start (S109). When the first start is made (YES in S109), the transfer sequence data included in the transfer management table data 206 is written into the non-volatile memory 320 (S110). In other words, in the transfer management table data 206, the page and the transfer sequence that exclude the transfer management flag are written into the non-volatile memory 320 as the transfer sequence data 305. With this, the instruction transfer sequence of the first process on a page-by-page basis is stored in the non-volatile memory 320. The determination on the first start is performed similarly to S107.

Figure 42:
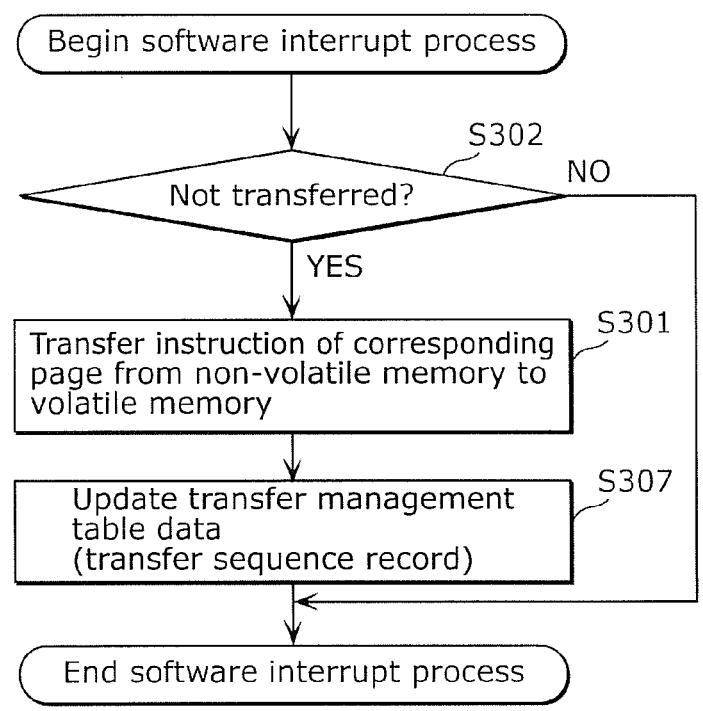
FIG. 42 is a detailed flowchart of the software interrupt process (S203 in FIG. 5).

FIG. 42 is a detailed flowchart of the software interrupt process (S203 in FIG. 5).

By referring to the transfer management table data 206 when the software interrupt is generated by the software interrupt instruction pi, the instruction transfer unit 118 determines whether or not the instructions are not transferred to the corresponding page (S302).

When the instructions are not transferred to the corresponding page (YES in S302), the instruction transfer unit 118 transfers the instructions to be stored in the corresponding page from the non-volatile memory 300 to the corresponding page of the volatile memory 230 (S301). Subsequently, the instruction transfer unit 118 updates the transfer management table data 206 (S307). In other words, the transfer management flag of the corresponding page is changed from 0 to 1. Moreover, when the information device 40 makes the first start, the transfer sequence of the corresponding page is written. The written transfer sequence is written into the non-volatile memory 320 as the transfer sequence data 305 by the above described process of S110 in FIG. 40.

It is to be noted that in the case where the instruction execution unit 102 is in an idle state when the second or subsequent start is made, the following processes are performed.

Figure 43:
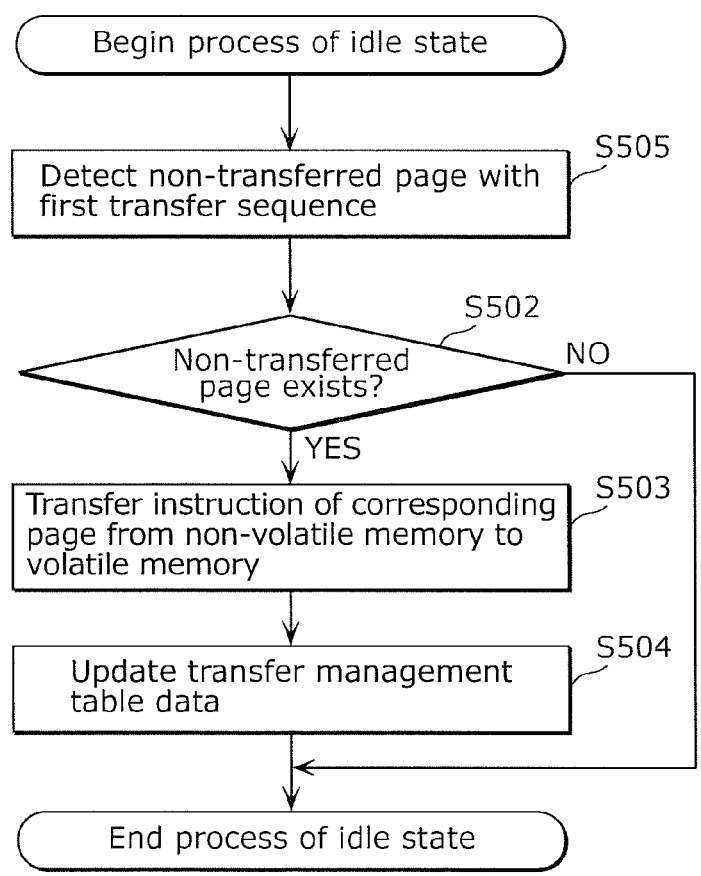
FIG. 43 is a flowchart showing a process performed when the instruction execution unit is in an idle state at the second or subsequent time of start.

FIG. 43 is a flowchart showing a process performed by the instruction transfer unit 118 in the case where the instruction execution unit 102 is in an idle state in the case where the second or subsequent start is made.

The instruction transfer unit 118 detects, by referring to the transfer management table data 206, the page in the first transfer sequence among the pages to which the instructions are not transferred (S505). For example, as shown in FIG. 44, it is assumed that the instructions are not transferred to pages B, C, and F in the instruction area 202. At this time, the transfer management table data 206 is as shown in FIG. 37. Therefore, the instruction transfer unit 118 detects the smallest transfer sequence page among the pages having the transfer management flag 0 in the transfer management table data 206. In other words, in the example of FIG. 37, page B is detected.

The instruction transfer unit 118 determines whether or not the non-transferred page has been detected (S502). When the non-transferred page is detected (YES in S502), the instruction transfer unit 118 transfers the instruction to be stored in the corresponding page that is the detected non-transferred page from the instruction area 302 to the corresponding page of the instruction area 202 (S503), and then updates the transfer management flags in the transfer management table data 206 (S504). For example, the transfer management flag of page B that is determined as the corresponding page is changed from 0 to 1.

When the page to which the instructions are not transferred is not detected (NO in S502), the instruction transfer unit 118 ends the process.

The instruction transfer unit 118 repeats the processes of S505, and S502 to S504 when the instruction execution unit 102 is in an idle state.

As described above, according to the information device 40 according to Embodiment 5, by transferring the instructions according to the transfer sequence from the non-volatile memory 320 to the volatile memory 230, a transfer of the instructions in advance can be performed effectively in the program in which the instruction execution sequence is determined to some extent. In other words, the total number of software interrupts caused by the execution of another interrupt generation code instead of the transferred instructions in advance can be reduced, and the advanced transferred instructions are executed at an early stage after the transfer of the instructions, with the result that the system start can be quickened.

Modification of Embodiment 5

It is to be noted that in Embodiment 5, the instructions are transferred in advance when the instruction execution unit 102 is in an idle state. However, immediately after the start of the information device 40, the instructions of the predetermined number of pages may be transferred before the instruction execution unit 102 starts executing the instructions, and subsequently, the execution of the instructions may be performed.

Figure 45:
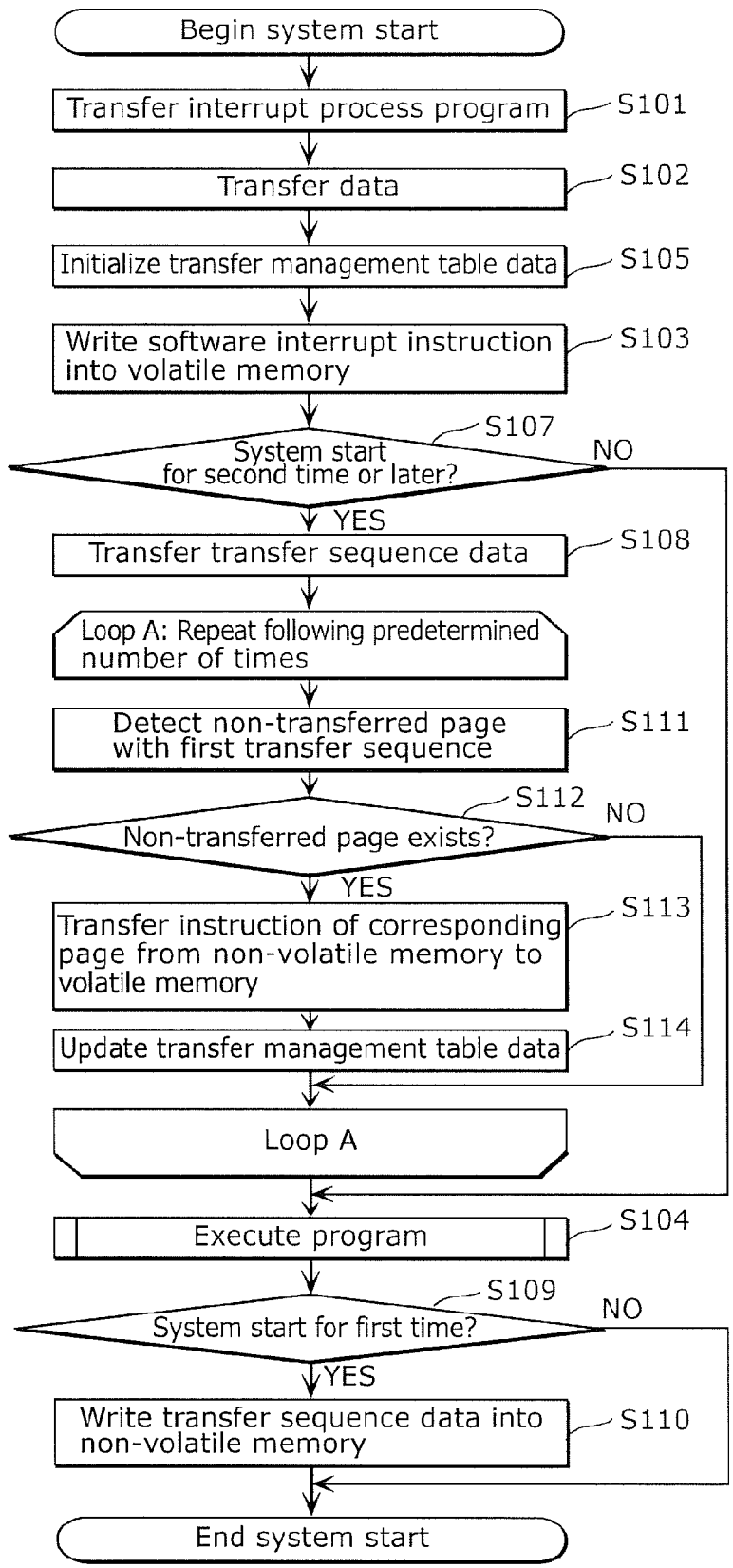
FIG. 45 is a flowchart of a process performed when the information device according to Modification of Embodiment 5 starts.

FIG. 45 is a flowchart of the processes performed when the information device 40 according to Modification of Embodiment 5 starts.

The basic flow of processes is similar to the processes performed when the information device 40 starts as shown in FIG. 40. However, a loop process (loop A) is added after the process of S108 and before the process of S104.

In loop A, the instruction transfer unit 118 first detects, by referring to the transfer management table data 206, the page in the first transfer sequence among the pages to which the instructions are not transferred (S111). Next, the instruction transfer unit 118 determines whether or not the non-transferred page has been detected (S112). When the non-transferred page is detected (YES in S112), the instruction transfer unit 118 transfers the instructions to be stored in the corresponding page that is the detected non-transferred page from the instruction area 302 to the corresponding page of the instruction area 202 (S113), and then updates the transfer management flags in the transfer management table data 206 (S114). The instruction transfer unit 118 repeats the processes of S111 to S114 a predetermined number of times (loop A). It is to be noted that the processes of S111 to S114 are similar to those performed by the instruction transfer unit 118 when the instruction execution unit 102 is in an idle state when the second or subsequent start is made as shown in FIG. 43.

Embodiment 6

The following will describe an information device according to Embodiment 6 of the present disclosure.

The information device according to Embodiment 6 stores, on a page-by-page basis, the interrupt prohibition state during the instruction transfer at the time of the first start, and transfers the instructions included in the pages in which the software interrupt is generated by the execution of the software interrupt instruction pi while the interrupt is being prohibited, to the volatile memory before the start of the program execution process (S104). With this, it is possible to prevent degradation of the interrupt responsiveness of the system caused by an increase in the interrupt prohibition period by the software interrupt process when the software interrupt is generated by the execution of the software interrupt instruction pi.

Figure 46:
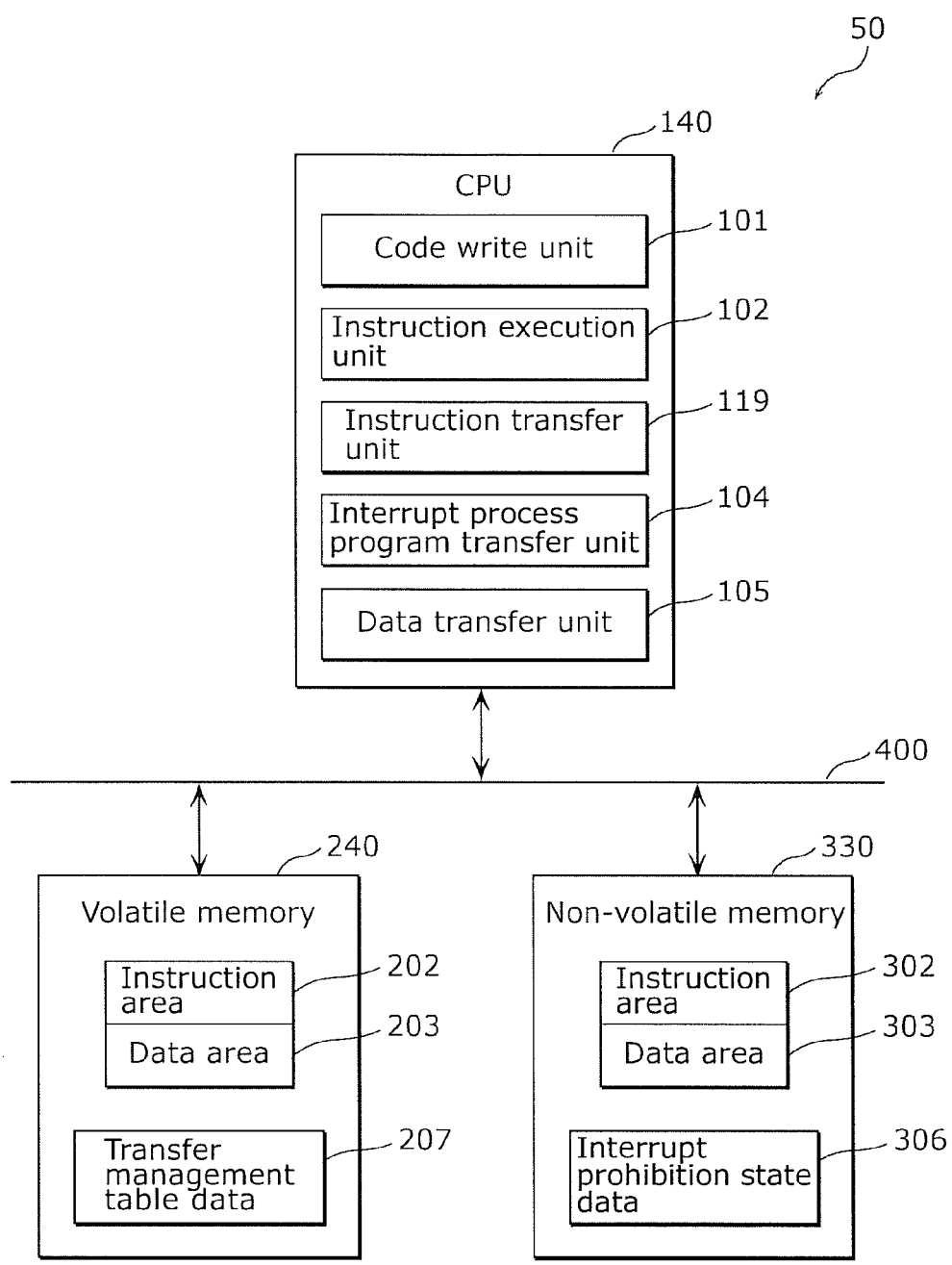
FIG. 46 is a block diagram showing a functional configuration of an information device according to Embodiment 6 of the present disclosure.

FIG. 46 is a block diagram showing a functional configuration of an information device according to Embodiment 6 of the present disclosure. In the following description, the same reference numerals are assigned to the same structural elements as those in the above described embodiments. Since the functions and names are the same as those in the above described embodiments, a description thereof will be omitted where appropriate.

An information device 50 is an apparatus which executes a program, and the information device 50 includes a CPU 140, a volatile memory 240, and a non-volatile memory 330. The CPU 140, the volatile memory 240, and the non-volatile memory 330 are connected to each other via the bus 400.

The CPU 140 is a processing unit which executes the program, and plays a role as a start control apparatus which controls the start of the information device 50. The volatile memory 240 is a volatile memory which stores the program performed by the CPU 140. The volatile memory 240 includes a dynamic random access memory (DRAM), for example. The non-volatile memory 330 is a non-volatile memory which stores a program transferred to the volatile memory 240 and executed by the CPU 140. The non-volatile memory 330 includes a NAND flash memory or a NOR flash memory, for example. The volatile memory 240 is accessible faster than the non-volatile memory 330.

Figure 47:
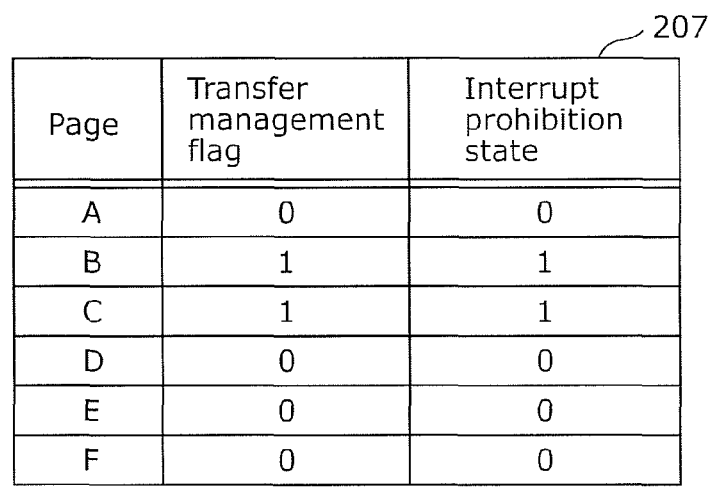
FIG. 47 is a diagram showing an example of the transfer management table data.

The volatile memory 240 includes the instruction area 202 and the data area 203. The volatile memory 240 stores transfer management table data 207. The transfer management table data 207 is data showing (i) pages in which the instruction has already been transferred from the non-volatile memory 330 to the volatile memory 240 and which are included in the instruction area 202 and (ii) an interrupt prohibition state that is the state showing whether or not the interrupt is prohibited when the instruction is transferred on a page-by-page basis from the non-volatile memory 330 to the volatile memory 240. FIG. 47 is a diagram showing an example of the transfer management table data 207. The transfer management table data 207 stores, on a page-by-page basis, a transfer management flag and an interrupt prohibition state. The transfer management flag is similar to that in Embodiment 2, and therefore a description thereof will be omitted. The interrupt prohibition state is 1 when the interrupt is prohibited at the time of the instruction transfer at the time of the first start, and the interrupt prohibition state is 0 when the interrupt is not prohibited. For example, as shown in FIG. 48, in the case where (i) the interrupt prohibition flag when the instructions are transferred to pages A to F is expressed as PSW.IM and (ii) the interrupt is prohibited when the value of PSW.IM is other than 7, the interrupt prohibition state of the transfer management table data 207 is as shown in FIG. 47. It is to be noted that PSW.IM is an interrupt prohibition level. For example, when the value of PSW.IM is 2, the interrupts having the interrupt prohibition levels of 0 and 1 are possible but the interrupts having the other interrupt prohibition levels are prohibited. It is to be noted that the value of PSW.IM may be directly used as the interrupt prohibition state.

The non-volatile memory 330 includes the instruction area 302 and the data area 303. The non-volatile memory 330 stores interrupt prohibition state data 306. The interrupt prohibition state data 306 is data showing, for each of the pages, the interrupt prohibition state when the instruction is transferred from the non-volatile memory 330 to the volatile memory 240. FIG. 49 is a diagram showing an example of the interrupt prohibition state data 306. The interrupt prohibition state data 306 stores, on a page-by-page basis, the interrupt prohibition state. For example, pages B and C each show that the interrupt is prohibited while the instructions are transferred at the time of the first start.

The CPU 140 includes the code write unit 101, the instruction execution unit 102, an instruction transfer unit 119, the interrupt process program transfer unit 104, and the data transfer unit 105.

The instruction transfer unit 119 transfers, by referring to the transfer management table data 207, regarding the interrupt prohibition page in which the interrupt is prohibited when the instruction is transferred, the instructions to be stored in the interrupt prohibition page from the non-volatile memory 330 to the interrupt prohibition page of the volatile memory 240 before the instructions to be stored in the corresponding interrupt prohibition page are executed, and then updates the transfer management table data 207.

It is to be noted that the data transfer unit 105 further transfers the interrupt prohibition state data 306 stored in the non-volatile memory 330 to the transfer management table data 207 of the volatile memory 240.

The following will describe the process performed at the start by the information device 50 with reference to specific examples. In the following description, the numerals similar to those in the above embodiments are assigned to the steps similar to those in the above embodiments. A description will be omitted thereof where appropriate.

Figure 50:
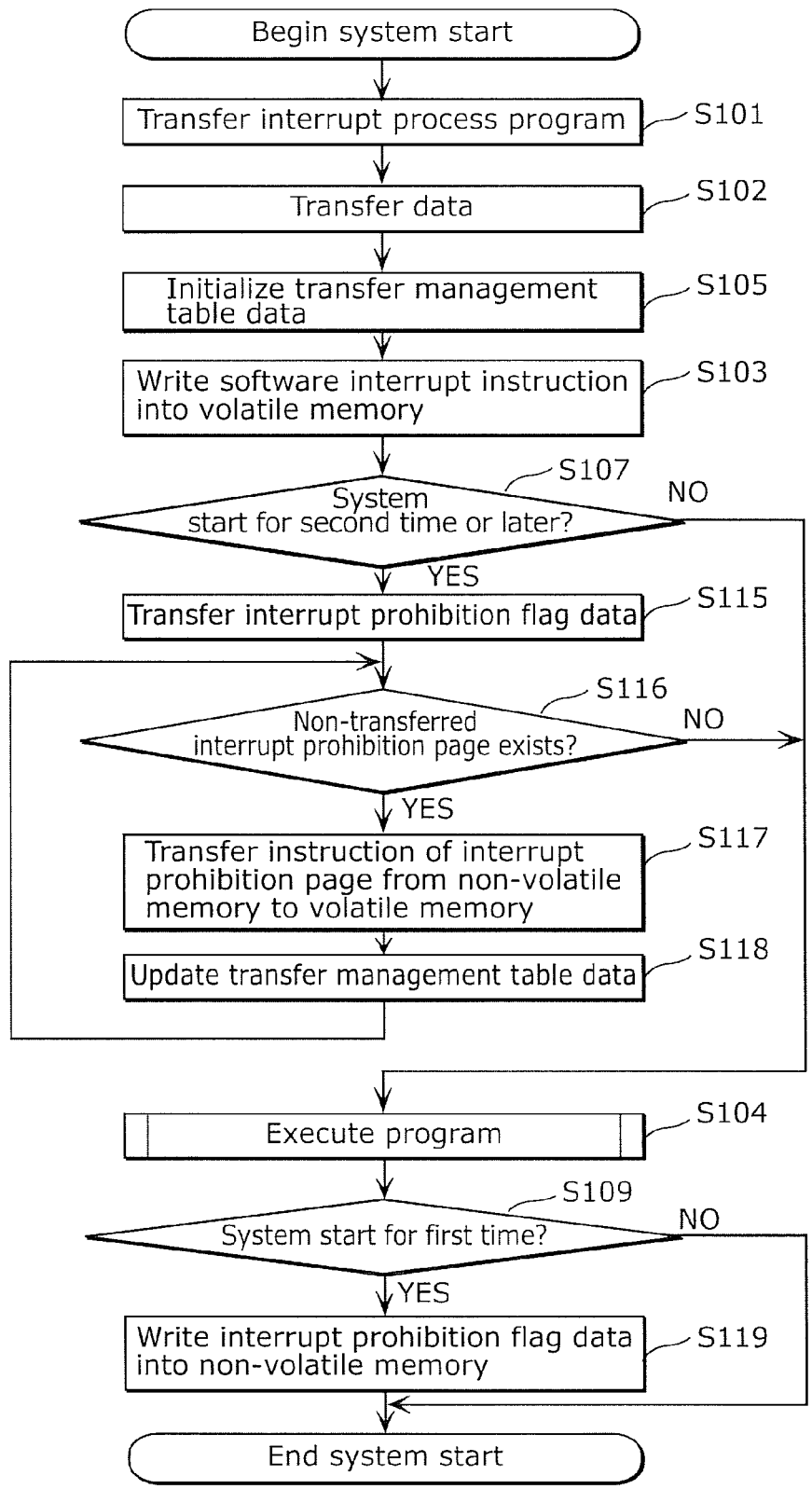
FIG. 50 is a flowchart of a process performed when the information device starts.

FIG. 50 is a flowchart of the processes performed when the information device 50 starts.

The flow of the processes of S101, S102, S105, and S103 is similar to the flow of processes performed by the information device 20 at the start shown in FIG. 12. After the software interrupt instruction write process (S103), the data transfer unit 105 determines whether or not the information device 50 makes the second or subsequent start (S107). When it is determined that the second or subsequent start is made, the interrupt prohibition state data 306 is transferred to the transfer management table data 207 (S115). In other words, the interrupt prohibition state data 306 stored in the non-volatile memory 330 is transferred to the transfer management table data 207 of the volatile memory 240. For example, by transferring the interrupt prohibition state data 306 shown in FIG. 49 to the transfer management table data 207, the transfer management table data 207 shown in FIG. 51 can be obtained. The determination on the second or subsequent start may be performed by holding the total number of starts in the non-volatile memory 330 and by referring to the total number of starts by the data transfer unit 105. Moreover, the interrupt prohibition state data 306 is not stored in the non-volatile memory 330 at the time of the first start. When the interrupt prohibition state data 306 is not stored in the non-volatile memory 330, it may be determined that the first start is made. When the interrupt prohibition state data 306 is stored in the non-volatile memory 330, it may be determined that the second or subsequent start is made.

Subsequently, by referring to the transfer management table data 207, the instruction transfer unit 119 determines whether or not the instruction prohibition page to which the instructions are not transferred exists (S116). In other words, the instruction transfer unit 119 determines that the instruction prohibition page to which the instructions are not transferred exists when the transfer management flag is 0 and the page of the interrupt prohibition flag is 1. When the value of PSW.IM is directly used as the interrupt prohibition state, the transfer process may be performed only in the case where the value is less than or equal to a constant value. For example, it is determined as the interrupt prohibition page only when the value of PSW.IM left as the interrupt prohibition state is less than or equal to 4 (the interrupt prohibition level is 0 to 4). When the interrupt prohibition page to which the instructions are not transferred exists (YES in S116), the instruction transfer unit 119 transfers the instructions to be stored in the interrupt prohibition page to which the instructions are not transferred from the instruction area 302 of the non-volatile memory 330 to the instruction prohibition page of the instruction area 202 of the volatile memory 240 (S117), and then updates the transfer management table data 207 (S118). In other words, the transfer management flag of the interrupt prohibition page in the transfer management table data 207 is changed from 0 to 1. The instruction transfer unit 119 repeats the processes of S117 and S118 until no more non-transferred interrupt prohibition page exists. FIG. 52 shows the state of the instruction area 202 after all the instructions have been transferred to the interrupt prohibition pages, and the transfer management table data 207 at this time is as shown in FIG. 47.

Subsequently, the program execution process is performed (S104). Details of the program execution process (S104) are similar to those shown in FIG. 5. It is to be noted that the software interrupt process (S203 in FIG. 5) executed in the program execution process (S104) is different from that in Embodiment 1.

After the program execution process (S104), the data transfer unit 105 determines whether or not the information device 50 made the first start (S109). When the first start is made (YES in S109), the interrupt prohibition state data included in the transfer management table data 207 is written into the non-volatile memory 330 (S119). In other words, in the transfer management table data 207, the page and the interrupt prohibition state that exclude the transfer management flag are written into the non-volatile memory 330 as the interrupt prohibition state data 306. With this, the interrupt prohibition state of the instruction at the time of the first start is stored in the non-volatile memory 330. The determination on the first start is performed similarly to S107.

Figure 53:
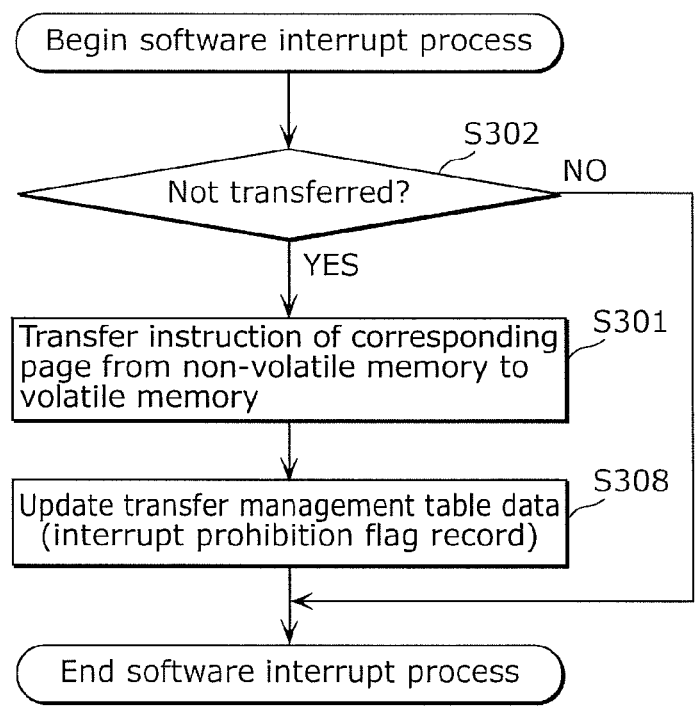
FIG. 53 is a detailed flowchart of a software interrupt process (S203 in FIG. 5).

FIG. 53 is a detailed flowchart of the software interrupt process (S203 in FIG. 5).

By referring to the transfer management table data 207 when the software interrupt is generated by the software interrupt instruction pi, the instruction transfer unit 119 determines whether or not the instructions are not transferred to the corresponding page (S302).

When the instructions are not transferred to the corresponding page (YES in S302), the instruction transfer unit 119 transfers the instructions to be stored in the corresponding page from the non-volatile memory 330 to the corresponding page of the volatile memory 240 (S301). Subsequently, the instruction transfer unit 119 updates the transfer management table data 207 (S308). In other words, the transfer management flag of the corresponding page is changed from 0 to 1. Moreover, in the case where the information device 50 made the first start, the prohibition state of the instruction execution unit 102 is written at the time of the instruction transfer to the corresponding page. The written interrupt prohibition state is written into the non-volatile memory 330 as the interrupt prohibition state data 306 by the above described process of S119 in FIG. 50.

As described above, the information device 50 according to Embodiment 6 transfers the instructions to be stored in the interrupt prohibition page, to the instruction area 202 of the volatile memory 240, before the instructions are executed. With this, it is possible to prevent degradation of the interrupt responsiveness caused by an increase in the interrupt prohibition period by the software interrupt process when the software interrupt is generated by the execution of the software interrupt instruction pi. Therefore, it is possible to quicken the system start of the information device 50 without degrading the system interrupt responsiveness.

Although the information device according to the embodiments of the present disclosure has been described, the present disclosure is not defined only by the embodiments.

The present disclosure can be implemented as the information device or the start control apparatus as shown in the above described embodiments. The structural elements essential for the start control apparatus are a code write unit, an instruction transfer unit, and an instruction execution unit. The structural elements essential for the information device are a non-volatile memory, a volatile memory, a code write unit, an instruction transfer unit, and an instruction execution unit.

The above described information device may be an apparatus which transfers the instructions stored in a non-volatile memory to a volatile memory and then executes the instructions, such as a digital still camera, a digital television, a mobile phone, a personal digital assistant (PDA), and the like.

Moreover, although in the above described embodiments, an example of the interrupt generation code has been described using the software interrupt instruction, the interrupt generation code is not limited to this. For example, the interrupt generation code may be an undefined code which causes exception handling and is not included in an instruction set implemented in the instruction execution unit.

It is to be noted that when the non-volatile memory is a NAND flash memory, read and write cannot be performed in a predetermined size unit such as 512 bytes or 2K bytes. Therefore, the page size to be transferred or managed in the present disclosure is preferably an integral multiple of the size in which the NAND flash memory can read and write.

When the non-volatile memory is a NOR flash memory which can read and write on a one byte-by-one byte basis, the page size to be transferred or managed in the present disclosure is any page size according to the system.

Moreover, although the interrupt process program transfer unit according to the above described embodiments writes a program of processes performed by the instruction execution unit into the volatile memory, the instruction execution unit may read the program from a ROM or a flash memory and then execute the program. Moreover, the instruction transfer unit may comprise dedicated hardware. In these cases, the interrupt process program transfer unit may be included in the information device.

Moreover, each of the above described embodiments and the modification may be combined.

The disclosed embodiments are exemplary in all points and are not limited. The scope of the present disclosure is not defined by the above description but by the Claims, and the Claims and their equivalents as well as all modifications within the scope are intended to be included.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to an information device which transfers instructions from the non-volatile memory to the volatile memory and then executes the instructions stored in the volatile memory, or a start control apparatus which controls the information device. The present disclosure can be notably applied to a digital still camera, a digital television, a mobile phone, a PDA, and the like.

The invention claimed is:

1. A start control apparatus for controlling a start of an information device which includes a non-volatile memory storing a plurality of instructions and a volatile memory that is accessible faster than the non-volatile memory, the start control apparatus comprising:
   a CPU,
   wherein the CPU is configured by execution of a control program to function as:
   a code write unit to write an interrupt generation code into a page in which the instructions stored in the non-volatile memory are not written, among a plurality of pages included in an instruction area that is an area of the volatile memory into which the instructions are written, the interrupt generation code being a code for generating a software interrupt;
   an instruction transfer unit to transfer the instructions from the non-volatile memory to a corresponding page of the volatile memory that is a page in which the interrupt generation code generating the software interrupt is stored when the software interrupt is generated by the interrupt generation code, the instructions being to be stored in the corresponding page; and
   an instruction execution unit to execute the instructions stored in the instruction area, and when the interrupt generation code is executed, generate a software interrupt, wherein:

in the transfer of the instructions, the instruction transfer unit overwrites the interrupt generation code with the instructions to be transferred, and when an execution of the software interrupt completes, the instruction execution unit resumes the execution of the instructions from an address at a start of the execution of the software interrupt.

2. The start control apparatus according to claim 1, wherein:

the volatile memory further stores transfer management table data showing a page which is included in the instruction area and in which the instructions have already been transferred from the non-volatile memory to the volatile memory, and the instruction transfer unit, when it is able to determine that the instructions are not transferred to the corresponding page by referring to the transfer management table data when the software interrupt is generated, transfers the instructions to be stored in the corresponding page from the non-volatile memory to the corresponding page of the volatile memory; and updates the transfer management table data.

3. The start control apparatus according to claim 1, wherein the instruction transfer unit (i) transfers, from the non-volatile memory to the corresponding page of the volatile memory, the instructions to be stored in the corresponding page when a software interrupt is generated by the interrupt generation code located in a page to which the instructions are not transferred, and writes the interrupt generation code into an instruction located across a boundary between the corresponding page and a page located immediately after the corresponding page, when the instructions are not transferred to the page located immediately after the corresponding page, and (ii) transfers the instructions to be stored in a page immediately after the instruction located across the boundary, from the non-volatile memory to the page of the volatile memory which is immediately after the instruction located across the boundary, when the software interrupt is generated by the interrupt generation code written into the instruction located across the boundary.

4. The start control apparatus according to claim 3, wherein:

the volatile memory further stores transfer management table data showing (i) a page which is included in the instruction area and in which the instructions have already been transferred from the non-volatile memory to the volatile memory, and (ii) an address, in the volatile memory, of a page boundary instruction that is an instruction located across a boundary between two pages, and the CPU is further configured by the execution of the control program to function as, within the instruction transfer unit:

a transfer unit to (i) determine the corresponding page as a page to be transferred to when it is able to be determined that the instructions are not transferred to the corresponding page by referring to the transfer management table data when the software interrupt is generated, (ii) determine the page located immediately after the corresponding page as a page to be transferred to when it is able to determine that the instructions have already been transferred to the corresponding page by referring to the transfer management table data when the software interrupt is generated, and (iii) transfer the instructions to be stored in the corresponding page determined as the page to be transferred to or the page located immediately after the corresponding page, from the non-volatile memory to the page to be transferred to of the volatile memory, and update the transfer management table data;

a first code write unit to write an interrupt generation code into an address of a page boundary instruction of the page to be transferred to when it is able to determine that the address of the page boundary instruction is included in an address of the page to be transferred to and the instructions are not transferred to a following page, by referring to the transfer management table data after a process by the transfer unit, the following page being a page located immediately after the page to be transferred to; and a second code write unit to write a page boundary instruction into an address of the page boundary instruction of a previous page when it is able to determine that the address of the page boundary instruction is included in an address of the previous page and the instructions have already been transferred to the previous page, by referring to the transfer management table data after the process by the transfer unit, the previous page being a page located immediately before the page to be transferred to.

5. The start control apparatus according to claim 1, wherein when the instruction execution unit is in an idle state, the instruction transfer unit transfers instructions to be stored in a page to which the instructions are not transferred, from the non-volatile memory to a page of the volatile memory to which the instructions are not transferred.

6. The start control apparatus according to claim 5, wherein:

the volatile memory further stores transfer management table data showing a page which is included in the instruction area and in which the instructions have already been transferred from the non-volatile memory to the volatile memory, and the instruction transfer unit detects a page to which the instructions are not transferred, by referring to the transfer management table data when the instruction execution unit is in an idle state, transfers the instructions to be stored in the detected page from the non-volatile memory to the detected page of the volatile memory, and updates the transfer management table data.

7. The start control apparatus according to claim 1, wherein:

the volatile memory further stores transfer management table data showing (i) a page which is included in the instruction area and in which the instructions have already been transferred from the non-volatile memory to the volatile memory, and (ii) a transfer sequence of instructions on a page-by-page basis from the non-volatile memory to the volatile memory, and the instruction transfer unit, by referring to the transfer management table data, when the instruction execution unit is in an idle state or before the instructions are executed, (i) transfers the instructions to be stored in a page to which the instructions are not transferred, from the non-volatile memory to a page of the volatile memory to which the instructions are not transferred, according to a transfer sequence indicated by the transfer management table data, and (ii) updates the transfer management table data.

8. The start control apparatus according to claim 1, wherein:
the volatile memory further stores transfer management table data showing (i) a page which is included in the instruction area and in which the instructions have already been transferred from the non-volatile memory to the volatile memory, and (ii) an interrupt prohibition state indicating, on a page-by-page basis, whether or not an interrupt is prohibited when the instructions are transferred from the non-volatile memory to the volatile memory, and
the instruction transfer unit, by referring to the transfer management table data before instructions to be stored in an interrupt prohibition page are executed, (i) transfers the instructions to be stored in the interrupt prohibition page from the non-volatile memory to the interrupt prohibition page of the volatile memory, and (ii) updates the transfer management table data, the interrupt prohibition page being a page in which an interrupt is prohibited when the instructions are transferred to.

9. The start control apparatus according to claim 1, wherein the CPU is further configured by the execution of the control program to function as:
an interrupt process program transfer unit to write a program of a process performed by the instruction transfer unit into the volatile memory, before the process is started by the instruction transfer unit.

10. The start control apparatus according to claim 1, wherein the interrupt generation code is a software interrupt instruction included in an instruction set implemented in the instruction execution unit.

11. The start control apparatus according to claim 1, wherein the interrupt generation code is an undefined code which causes exception handling and is not included in an instruction set implemented in the instruction execution unit.

12. The start control apparatus according to claim 1, wherein the CPU is further configured by the execution of the control program to function as:
a data transfer unit to transfer constant data stored in the non-volatile memory to the volatile memory, before the instructions are executed by the instruction execution unit.

13. An information device comprising:
the non-volatile memory storing the plurality of instructions;
the volatile memory accessible faster than the non-volatile memory; and
the start control apparatus according to claim 1.

14. A start control method for controlling a start of an information device which includes a non-volatile memory storing a plurality of instructions and a volatile memory that is accessible faster than the non-volatile memory, the state control method comprising:
writing an interrupt generation code into a page in which the instructions stored in the non-volatile memory are not written, among a plurality of pages included in an instruction area that is an area of the volatile memory into which the instructions are written, the interrupt generation code being a code for generating a software interrupt;
transferring the instructions from the non-volatile memory to a corresponding page of the volatile memory that is a page in which the interrupt generation code generating the software interrupt is stored when the software interrupt is generated by the interrupt generation code, the instructions being to be stored in the corresponding page; and
executing the instructions stored in the instruction area, and when the interrupt generation code is executed, generate a software interrupt, wherein:
in the transfer of the instructions, the interrupt generation code is overwritten with the instructions to be transferred, and
when an execution of the software interrupt completes, the execution of the instructions is resumed from an address at a start of the execution of the software interrupt.

15. The start control method according to claim 14, wherein:
the volatile memory further stores transfer management table data showing a page which is included in the instruction area and in which the instructions have already been transferred from the non-volatile memory to the volatile memory, and
when it is able to determine that the instructions are not transferred to the corresponding page by referring to the transfer management table data when the software interrupt is generated, the instructions to be stored in the corresponding page are transferred from the non-volatile memory to the corresponding page of the volatile memory, and the transfer management table data is updated.

16. The start control method according to claim 14, in the transferring the instructions, (i) the instructions to be stored in the corresponding page are transferred from the non-volatile memory to the corresponding page of the volatile memory, when a software interrupt is generated by the interrupt generation code located in a page to which the instructions are not transferred, and the interrupt generation code is written into an instruction located across a boundary between the corresponding page and a page located immediately after the corresponding page, when the instructions are not transferred to the page located immediately after the corresponding page, and (ii) the instructions to be stored in a page immediately after the instruction located across the boundary, are transferred from the non-volatile memory to the page of the volatile memory which is immediately after the instruction located across the boundary, when the software interrupt is generated by the interrupt generation code written into the instruction located across the boundary.

17. The start control method according to claim 16, wherein:
the volatile memory further stores transfer management table data showing (i) a page which is included in the instruction area and in which the instructions have already been transferred from the non-volatile memory to the volatile memory, and (ii) an address, in the volatile memory, of a page boundary instruction that is an instruction located across a boundary between two pages, and
the transferring the instructions further includes:
(i) determining the corresponding page as a page to be transferred to when it is able to be determined that the instructions are not transferred to the corresponding page by referring to the transfer management table data when the software interrupt is generated,
(ii) determining the page located immediately after the corresponding page as a page to be transferred to when it is able to determine that the instructions have already been transferred to the corresponding page by referring to the transfer management table data when the software interrupt is generated, and (iii) transferring the instructions to be stored in the corresponding page determined as the page to be transferred to or the page located immediately after the corresponding page, from the non-volatile memory to the page to be transferred to of the volatile memory, and updating the transfer management table data;

writing an interrupt generation code into an address of a page boundary instruction of the page to be transferred to when it is able to determine that the address of the page boundary instruction is included in an address of the page to be transferred to and the instructions are not transferred to a following page, by referring to the transfer management table data after a process by the transferring the instructions, the following page being a page located immediately after the page to be transferred to; and writing a page boundary instruction into an address of the page boundary instruction of a previous page when it is able to determine that the address of the page boundary instruction is included in an address of the previous page and the instructions have already been transferred to the previous page, by referring to the transfer management table data after the process by the transferring the instructions, the previous page being a page located immediately before the page to be transferred to.

18. The start control method according to claim 14, wherein:

the volatile memory further stores transfer management table data showing (i) a page which is included in the instruction area and in which the instructions have already been transferred from the non-volatile memory to the volatile memory, and (ii) a transfer sequence of instructions on a page-by-page basis from the non-volatile memory to the volatile memory, and in the transferring the instructions, by referring to the transfer management table data, when the instructions are not being executed or before the instructions are executed, (i) the instructions to be stored in a page to which the instructions are not transferred, are transferred from the non-volatile memory to a page of the volatile memory to which the instructions are not transferred, according to a transfer sequence indicated by the transfer management table data, and (ii) the transfer management table data is updated.

19. The start control method according to claim 14, wherein:

the volatile memory further stores transfer management table data showing (i) a page which is included in the instruction area and in which the instructions have already been transferred from the non-volatile memory to the volatile memory, and (ii) an interrupt prohibition state indicating, on a page-by-page basis, whether or not an interrupt is prohibited when the instructions are transferred from the non-volatile memory to the volatile memory, and in the transferring the instructions, by referring to the transfer management table data before instructions to be stored in an interrupt prohibition page are executed, (i) the instructions to be stored in the interrupt prohibition page are transferred from the non-volatile memory to the interrupt prohibition page of the volatile memory, and (ii) the transfer management table data is updated, the interrupt prohibition page being a page in which an interrupt is prohibited when the instructions are transferred to.

20. The start control method according to claim 14, further comprising:

writing a program of a process performed in the transferring the instructions into the volatile memory, before the process is started.

21. The start control method according to claim 14, further comprising:

transferring constant data stored in the non-volatile memory to the volatile memory, before the instructions are executed.

\* \* \* \* \*